(12) United States Patent
Chen et al.

(10) Patent No.: US 10,816,438 B2
(45) Date of Patent: Oct. 27, 2020

(54) MACHINE LEARNING FOR MISFIRE DETECTION IN A DYNAMIC FIRING LEVEL MODULATION CONTROLLED ENGINE OF A VEHICLE

(71) Applicant: Tula Technology, Inc., San Jose, CA (US)

(72) Inventors: Shikui Kevin Chen, San Jose, CA (US); Aditya Mandal, San Jose, CA (US); Li-Chun Chien, Milpitas, CA (US); Elliott Ortiz-Soto, San Jose, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 16/180,703

(22) Filed: Nov. 5, 2018

(65) Prior Publication Data

US 2019/0145859 A1    May 16, 2019

Related U.S. Application Data

(60) Provisional application No. 62/585,648, filed on Nov. 14, 2017.

(51) Int. Cl.
  *G01M 15/11*    (2006.01)
  *F02D 35/02*    (2006.01)
  (Continued)

(52) U.S. Cl.
  CPC .......... *G01M 15/11* (2013.01); *F02D 35/023* (2013.01); *F02D 35/028* (2013.01);
  (Continued)

(58) Field of Classification Search
  CPC ........ F02D 13/06; F02D 35/02; F02D 35/025; F02D 35/028; F02D 41/00;
  (Continued)

(56) References Cited

U.S. PATENT DOCUMENTS 4,434,767 A    3/1984  Kohama et al.
4,489,695 A   12/1984  Kohama et al.
(Continued)

FOREIGN PATENT DOCUMENTS

WO    WO 2010/006311    1/2010
WO    WO 2011/085383    7/2011

OTHER PUBLICATIONS

International Search Report and Written Opinion dated Jan. 18, 2019 from International Application No. PCT/US2018/059210.
(Continued)

*Primary Examiner* — John Kwon
*Assistant Examiner* — Johnny H Hoang
(74) *Attorney, Agent, or Firm* — Beyer Law Group LLP

(57) ABSTRACT

Using machine learning for misfire detection in a Dynamic firing level modulation controlled internal combustion engine is described. A neural network is used to calculate expected crank acceleration from various inputs, including the dynamically defined cylinder skip fire sequence. The output of the neural network is then compared to a signal indicative of the measured crank acceleration. Based the comparison, a prediction is made if a misfire has occurred or not. In alternative embodiment, the neural network is expanded to include the measured crank acceleration as an additional input. With the latter embodiment, the neural network is arranged to directly predict misfire events.

51 Claims, 17 Drawing Sheets

(51) Int. Cl.
*G06N 3/08* (2006.01)
*G06N 5/04* (2006.01)
*G06N 20/00* (2019.01)
*F02D 41/00* (2006.01)
*F02D 41/14* (2006.01)
*G06N 3/04* (2006.01)

(52) U.S. Cl.
CPC ...... *F02D 41/0087* (2013.01); *F02D 41/1405* (2013.01); *F02D 41/1497* (2013.01); *G06N 3/0481* (2013.01); *G06N 3/08* (2013.01); *G06N 3/084* (2013.01); *G06N 5/046* (2013.01); *G06N 20/00* (2019.01); *F02D 2041/1412* (2013.01); *F02D 2200/1012* (2013.01); *F02D 2200/1015* (2013.01)

(58) Field of Classification Search
CPC ...... F02D 41/0087; F02D 41/04; F02D 41/14; F02D 41/1405; F02D 41/1497; G01M 15/04; G01M 15/11; G06N 3/04; G06N 3/0481; G06N 3/08; G06N 3/084; G06N 5/04; G06N 5/046; G06N 20/00; B60W 10/06
USPC .................................. 701/101–105, 111–115
See application file for complete search history.

(56) References Cited

U.S. PATENT DOCUMENTS

| | | | |
|---|---|---|---|
| 4,509,488 A | | 4/1985 | Forster et al. |
| 5,377,631 A | | 1/1995 | Schechter |
| 5,433,107 A | * | 7/1995 | Angermaier ........... G01M 15/11 73/114.03 |
| 5,774,823 A | | 6/1998 | James et al. |
| 5,826,563 A | * | 10/1998 | Patel ........................ F02D 17/02 123/481 |
| 6,006,155 A | * | 12/1999 | Wu ........................ F02D 41/1498 123/406.24 |
| 6,158,411 A | | 12/2000 | Morikawa |
| 6,564,623 B2 | | 5/2003 | Zanetti |
| 6,619,258 B2 | | 9/2003 | McKay et al. |
| 6,801,848 B1 | * | 10/2004 | Mathews ............... G01M 15/11 123/406.14 |
| 7,063,062 B2 | | 6/2006 | Lewis et al. |
| 7,066,136 B2 | | 6/2006 | Ogiso |
| 7,086,386 B2 | | 8/2006 | Doering |
| 7,234,442 B2 | * | 6/2007 | Hanson ................. F02D 41/009 123/179.4 |
| 7,503,312 B2 | | 3/2009 | Surnilla et al. |
| 7,577,511 B1 | | 8/2009 | Tripathi et al. |
| 7,930,087 B2 | | 4/2011 | Gibson et al. |
| 8,099,224 B2 | | 1/2012 | Tripathi et al. |
| 8,601,862 B1 | | 12/2013 | Bowman et al. |
| 8,931,255 B2 | | 1/2015 | Wilson et al. |
| 9,086,020 B2 | | 7/2015 | Tripathi et al. |
| 9,212,610 B2 | | 12/2015 | Chen et al. |
| 9,399,963 B2 | | 7/2016 | Loucks et al. |
| 9,399,964 B2 | | 7/2016 | Younkins et al. |
| 9,523,319 B2 | | 12/2016 | Wilson et al. |
| 9,581,098 B2 | | 2/2017 | Chen et al. |
| 9,587,567 B2 | | 3/2017 | Zhang et al. |
| 9,784,644 B2 | | 10/2017 | Chen et al. |
| 10,072,592 B2 | | 9/2018 | Younkins et al. |
| 10,088,388 B2 | | 10/2018 | Chen et al. |
| 2007/0113803 A1 | | 5/2007 | Froloff et al. |
| 2008/0243364 A1 | | 10/2008 | Sun et al. |
| 2009/0099755 A1 | * | 4/2009 | Harbert ............... F02D 41/0087 701/103 |
| 2009/0158830 A1 | | 6/2009 | Malaczynski et al. |
| 2010/0050993 A1 | | 3/2010 | Zhao et al. |
| 2017/0002761 A1 | * | 1/2017 | Dudar ..................... F02M 25/06 |
| 2017/0218866 A1 | | 8/2017 | Shost et al. |
| 2017/0370804 A1 | * | 12/2017 | Chen ................... F02D 41/0087 |
| 2019/0234323 A1 | * | 8/2019 | Weber ................. F02D 41/0087 |

OTHER PUBLICATIONS

Cybenko, "Approximation by Superpositions of a Sigmoidal Function", Mathematics of Control, Signals, and Systems, (1989) 2: 303-314.

Hinton et al., "Deep Neural Networks for Acoustic Modeling in Speech Recognition", Signal Processing Magazine, IEEE, 29(6): 8297, 2012a, Apr. 27, 2012.

Krizhevsky et al., "ImageNet Classification with Deep Convolutional Neural Networks", https://papers.nips.cc/paper/4824-imagenet-classification-with-deep-convolutional-neural-networks.pdf, Jan. 2012.

Weston et al., "Towards AI-Complete Question Answering: A Set of Prerequisite Toy Tasks", ICLR, Dec. 31, 2015.

Glorot et al., "Understanding the Difficulty of Training Deep Feedforward Neural Networks", In Proceedings of AISTATS 2010, vol. 9, pp. 249-256, May 2010.

Wilcutts et al., "Design and Benefits of Dynamic Skip Fire Strategies for Cylinder Deactivated Engines", SAE Int. J. Engines, 6(1): 2013, doi: 10.4271/2013-01-0359, Apr. 8, 2013.

Serrano et al., "Methods of Evaluating and Mitigating NVH When Operating an Engine in Dynamic Skip Fire", SAE Int. J. Engines 7(3): 2014, doi: 10.4271/2014-01-1675, Apr. 1, 2014.

Liu et al., "Standards Compliant HIL Bench Development for Dynamic Skip Fire Feature Validation", SAE Technical Paper 2015-01-0171, 2015, Apr. 14, 2015.

Chen et al., "Misfire Detection in a Dynamic Skip Fire Engine", SAE Int. J. Engines 8(2): 389-398, 2015, Apr. 14, 2015.

Chien et al., "Modeling and Simulation of Airflow Dynamics in a Dynamic Skip Fire Engine", SAE Technical Paper 2015-01-1717, Apr. 14, 2015.

Eisazadeh-Far et al., "Fuel Economy Gains Through Dynamic-Skip-Fire in Spark Ignition Engines", SAE Technical Paper 2016-01-0672, Jul. 20, 2015.

Wilcutts et al., "eDSF: Dynamic Skip Fire Extension to Hybrid Powertrains", 7th Aachen Colloquium China Automobile and Engine Technology 2017.

Ortiz-Soto et al., "DSF: Dynamic Skip Fire with Homogeneous Lean Burn for Improved Fuel Consumption, Emissions and Drivability", SAE Technical Paper 2018-01-1891, Apr. 3, 2018.

Chen et al., "Machine Learning for Misfire Detection in a Dynamic Skip Fire Engine", SAE Technical Paper 2018-01-1158, Apr. 3, 2018.

Chen et al., "Dynamic Skip Fire Applied to a Diesel Engine for Improved Fuel Consumption and Emissions", Presented at the 4. Int. Conf. Diesel Powertrains 3.0, Jul. 3-4, 2018.

Younkins et al., "Advances in Dynamic Skip Fire: eDSF and mDSF", 27th Aachen Colloquium Automobile and Engine Technology, 2018.

Younkins et al., "Dynamic Skip Fire: New Technologies for Innovative Propulsion Systems", General Motors Global Propulsion Systems, 39th International Vienna Motor Symposium, Apr. 2018.

Younkins et al., "Dynamic Skip Fire: The Ultimate Cylinder Deactivation Strategy", 29th Edition of the Sia Powertrain Congress, Versailles, Jun. 7-8, 2017.

Asik et al., "Transient A/F Estimation and Control Using a Neural Network", SAE Technical Paper 970619, 1997 (SP-1236), 1997.

Kalogirou et al., "Development of an Artificial Neural Network Based Fault Diagnostic System of an Electric Car", Design and Technologies for Automotive Safety-Critical Systems, SAE Technical Paper 2000-011055, 2000 (SP-1507), Mar. 6-9, 2000.

Wu et al., "Misfire Detection Using a Dynamic Neural Network with Output Feedback", Electronic Engine Controls 1998: Diagnostics and Controls, SAE Technical Paper 980515, 1998 (SP-1357), Feb. 23-26, 1998.

Nareid et al., "Detection of Engine Misfire Events Using an Artificial Neural Network", Electronic Engine Controls, SAE Technical Paper 2004-01-1363, 2004 (SP-1822), Mar. 8-11, 2004.

Kirkham et al., "Misfire Detection Including Confidence Indicators Using a Hardware Neural Network", Electronic Engine Controls, SAE Technical Paper, 2006-01-1349, 2006 (SP-2003), Apr. 3-6, 2006.

(56) References Cited

OTHER PUBLICATIONS

Merkisz et al., "Overview of Engine Misfire Detection Methods Used in on Board Diagnostics", Journal of Kones Combustion Engines, vol. 8, No. 1-2, 2001.
Chatterjee et al., "Comparison of Misfire Detection Technologies on Spark-ignition Engines for Meeting On-Board Diagnostic Regulation", 2013 SAE International, doi: 10 4271/2013-01-2884, Nov. 27, 2013.
Bue et al., "Misfire Detection System Based on the Measure of Crankshaft Angular Velocity", Advanced Microsystems for Automotive Applications, 2007, pp. 149-161.
Baghi Abadi et al., "Single and Multiple Misfire Detection in Internal Combustion Engines Using Vold-Kalman Filter Order-Tracking", SAE Technical Paper 2011-01-1536, 2011, doi: 10,4271/2011-01-1536, May 17, 2011.
Shiao et al., "Cylinder Pressure and Combustion Heat Release Estimation for SI Engine Diagnostics Using Nonlinear Sliding Observers", IEEE Transactions on Control Systems Technology, vol. 3. No. 1, Mar. 1995.
Ball et al., "Torque Estimation and Misfire Detection Using Block Angular Acceleration", SAE Technical Paper 2000-01-0560, Mar. 6-9, 2000.
Abu-Mostafa et al., "Learning From Data", AMLbook.com, ISBN 10:1 60049 006 9, ISBN 13:978 1 60049 006 4, Chapter 7, 2012.
Pedregosa et al., "Scikit-Learn: Machine Learning in Python", Journal of Machine Learning Research, 12 (2011) 2825-2830, Oct. 2011.
International Preliminary Report on Patentability dated Nov. 20, 2019 from International Application No. PCT/US2018/059210.

\* cited by examiner

| Total Population 4683 | Actual Condition | |
|---|---|---|
| | Actual Positive 65 | Actual Negative 4618 |
| Predicted Positive | True Positive (Probability of Detection) 63 / 0.9692 | False Positive (Type I Error Rate) 9 / 0.0019 |
| Predicted Negative | False Negative (Type II for Rate) 2 / 0.0308 | True Negative (Specificity) 4609 / 0.9981 |
| | F1 Score 0.9197 | |

Predicted Condition

FIG. 9

|  | Actual Condition | |
|---|---|---|
| Total Population 7392 | Actual Positive 240 | Actual Negative 7152 |
| Predicted Positive | True Positive (Probability of Detection) 230 0.9583 | False Positive (Type I Error Rate) 6 0.0008 |
| Predicted Negative | False Negative (Type II for Rate) 10 0.0417 | True Negative (Specificity) 7146 0.9992 |
| Predicted Condition | F1 Score 0.9197 | |

FIG. 10

| Total Population 4683 | Actual Condition | |
|---|---|---|
| | Actual Positive 65 | Actual Negative 4618 |
| Predicted Positive | True Positive (Probability of Detection) 63 0.9692 | False Positive (Type I Error Rate) 3 0.0006 |
| Predicted Negative | False Negative (Type II for Rate) 2 0.0308 | True Negative (Specificity) 4615 0.9994 |
| | F1 Score 0.9618 | |

Predicted Condition

FIG. 16

| Total Population 7392 | Actual Condition | |
|---|---|---|
| | Actual Positive 240 | Actual Negative 7152 |
| Predicted Positive | True Positive (Probability of Detection) 231 / 0.9625 | False Positive (Type I Error Rate) 11 / 0.0015 |
| Predicted Negative | False Negative (Type II for Rate) 9 / 0.0375 | True Negative (Specificity) 7141 / 0.9994 |
| Predicted Condition | F1 Score 0.9585 | |

FIG. 17

MACHINE LEARNING FOR MISFIRE DETECTION IN A DYNAMIC FIRING LEVEL MODULATION CONTROLLED ENGINE OF A VEHICLE

CROSS-REFERENCE TO RELATED APPLICATIONS

This application claims priority of U.S. Provisional Application No. 62/585,648, entitled "Machine Learning for Misfire Detection in a Dynamic Skip Fire Engine" filed on Nov. 14, 2017, which is incorporated herein by reference in its entirety for all purposes.

BACKGROUND

The present invention relates generally to operating an internal combustion engine having a plurality of cylinders in a Dynamic Skip Fire (DSF) mode to improve fuel efficiency, and more particularly, to using machine learning to detect cylinder misfires while operating the internal combustion engine in the DSF mode.

Most vehicles in operation today are powered by internal combustion (IC) engines. Internal combustion engines typically have a plurality of cylinders where combustion occurs. Under normal driving conditions, the torque generated by an internal combustion engine needs to vary over a wide range in order to meet the operational demands of the driver.

The fuel efficiency of many types of internal combustion engines can be substantially improved by dynamically varying the displacement of the engine. With dynamic displacement, the engine can generate full displacement when needed, but otherwise operate at a smaller displacement when full torque is not required, resulting in improved fuel efficiency.

The most common method of varying the displacement today is deactivating one or more banks or groups of cylinders. For example, with a six cylinder engine, a bank of three cylinders may be deactivated or groups of two, three, or four cylinders may be deactivated. With this approach, no fuel is delivered to the deactivated cylinders and their associated intake and exhaust valves are kept closed as long as the cylinders remain deactivated.

Another engine control approach that varies the effective displacement of an engine is referred to as "dynamic skip fire" (DSF) engine control. In general, skip fire engine control contemplates selectively skipping the firing of certain cylinders during selected firing opportunities. Thus, a particular cylinder may be fired during one engine cycle and then may be skipped during the next engine cycle and then selectively skipped or fired during the next. Skip fire engine operation is distinguished from conventional variable displacement engine control in which a designated group of one or more cylinders is simultaneously deactivated and remain deactivated as long as the engine remains in the same effective reduced displacement.

In general, DSF engine control facilitates finer control of the effective engine displacement than is possible using a conventional variable displacement approach. For example, firing every third cylinder in a 4-cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns. The Applicant has filed a number of patents describing various approaches to skip fire control. By way of example, U.S. Pat. Nos. 7,849,835; 7,886,715; 7,954,474; 8,099,224; 8,131,445; 8,131,447; 8,464,690; 8,616,181; 8,651,091; 8,839,766; 8,869,773; 9,020,735; 9,086,020; 9,120,478; 9,175,613; 9,200,575; 9,200,587; 9,291,106; 9,399,964 and others, describe a variety of engine controllers that make it practical to operate a wide variety of internal combustion engines in a skip fire operational mode. Each of these patents is incorporated herein by reference.

Many of these patents relate to dynamic skip fire control in which firing decisions regarding whether to skip or fire a particular cylinder during a particular working cycle are made in real time—often just briefly before the working cycle begins and often on an individual cylinder firing opportunity by firing opportunity basis.

A number of methods are known to detect misfires with conventional all-cylinder firing spark-ignition engines. One such approach relies on determining crankshaft angular acceleration during the power stroke. In a conventional all-cylinder firing engine, all the engine's cylinders generate approximately equal torque during their respective power strokes. The total engine torque is the sum of the individual cylinder torques with the appropriate phase offset between them. Since angular acceleration is proportional to torque, the misfire of a particular cylinder results in reduced angular acceleration during the power stroke of that cylinder. This reduced angular acceleration is used to determine a misfire. Other known methods rely on using a signal of a knock sensor or a torque model. For conventional all-cylinder firing engines, these approaches provide a reasonably accurate means for misfire detection.

In a controlled DSF engine, however, the above approaches are inadequate for misfire detection. During DSF operation, the firing state (i.e. either fired or skipped) of other cylinders will impact the angular acceleration for the cylinder under test. Also, the cylinder under test may be dynamically skipped instead of fired, which results in a missing torque pulse and/or low angular acceleration. Since the lack of torque production in a skipped cylinder has an angular acceleration profile similar to a misfire, it difficult to discern a misfire from a skip when looking only at angular acceleration during that cylinder's power stroke.

Machine learning has been used in various fields for predictive analysis for a number of years now. Artificial neural networks and deep learning are now commonly used to address complex problems such as image recognition, speech recognition, and natural language processing for instance. In the automotive industry, the use of neural networks is known in such areas ranging from air/fuel ratio estimation and control and vehicle fault diagnostics, including misfire detection in conventional internal combustion engines. However, to the best knowledge of the Applicant, machine learning has not been applied to misfire detection for a DSF controlled internal combustion engine.

SUMMARY

The present application is directed toward using machine learning for misfire detection in a dynamic firing level modulation controlled internal combustion engine. Dynamic firing level modulation, as used herein, is intended to be broadly construed to include, but is not limited to (a) Dynamic Skip Fire (DSF) where cylinders are selectively either fired or skipped and/or (b) dynamic multi-charge level operation where all cylinders are fired, but individual working cycles are intentionally operated at different output levels.

In a first non-exclusive embodiment, a neural network is used to calculate an expected crank acceleration from various inputs indicative of the vehicle and its operation. The output of the neural network is then compared to a signal indicative of the measured crank acceleration. Based upon the comparison, a prediction is made if a misfire has occurred or not.

In a second non-exclusive embodiment, the neural network is arranged to receive both the inputs indicative of the vehicle and its operation and the signal indicative of the measured crank acceleration. The neural network, in response, directly predict the probability of a misfire. If the probability exceeds a threshold, then it is determined that a misfire occurred.

In various non-exclusive embodiments, the various inputs indicative of the vehicle and its operation include both details of the vehicle and specifics on DSF and dynamic multi-charge level operation of the vehicle.

BRIEF DESCRIPTION OF THE DRAWINGS

The invention and the advantages thereof, may best be understood by reference to the following description taken in conjunction with the accompanying drawings in which:

FIGS. 9-10 are representative confusion matrices showing the validation results of the regression model.

FIGS. 16-18 illustrate various test results for predicting misfires for a Dynamic Skip Fire (DSF) controlled internal combustion engine using a classification-based model in accordance with another embodiment of the present invention.

In the drawings, like reference numerals are sometimes used to designate like structural elements. It should also be appreciated that the depictions in the figures are diagrammatic and not to scale.

DETAILED DESCRIPTION

The present application is directed toward using machine learning for misfire detection in a dynamic firing level modulation controlled internal combustion engine, which is intended to include both (a) Dynamic Skip Fire (DSF) where cylinders are selectively either fired or skipped and/or (b) dynamic multi-charge level operation where all cylinders are fired, but individual working cycles are intentionally operated at different output levels. For the sake of brevity, the machine learning approach for misfire detection is largely described in the context of DSF control of an internal combustion engine. It should be understood that the same machine learning approach can also be applied to dynamic multi-charge level operation in a very similar manner. The following discussion should therefore not be construed as limiting in any regard.

Dynamic Skip Fire (DSF) engine controllers often have a defined set of firing patterns or firing fractions that can be used during skip fire operation of an internal combustion engine. Each firing pattern/fraction has a corresponding effective engine displacement. Often the set of firing patterns/fractions that are supported is relatively limited—for example—a particular engine may be limited to using firing fractions of $1/3$, $1/2$, $2/3$ and 1. Other skip fire controllers facilitate the use of significantly more unique firing patterns or fractions. By way of example, some skip fire controllers designed by the Applicant facilitate operation at any firing fraction between zero (0) and one (1) having an integer denominator of nine (9) or less. Such a controller has a set of 29 potential firing fractions, specifically: 0, $1/9$, $1/8$, $1/7$, $1/6$, $1/5$, $2/9$, $1/4$, $2/7$, $1/3$, $3/8$, $2/5$, $3/7$, $4/9$, $1/2$, $5/9$, $4/7$, $3/5$, $5/8$, $2/3$, $5/7$, $3/4$, $7/9$, $4/5$, $5/6$, $6/7$, $7/8$, $8/9$ and 1. Although 29 potential firing fractions may be possible, not all firing fractions are suitable for use in all circumstances. Rather, at any given time, there may be a much more limited set of firing fractions that are capable of delivering the desired engine torque while satisfying manufacturer imposed drivability and noise, vibration and harshness (NVH) constraints. An engine's firing pattern or firing fraction may also be expressed as an effective operational displacement, which indicates the average displacement of the engine used to generate torque by combustion of fuel under the current operating conditions.

Improved Fuel Efficiency

Figure 1:
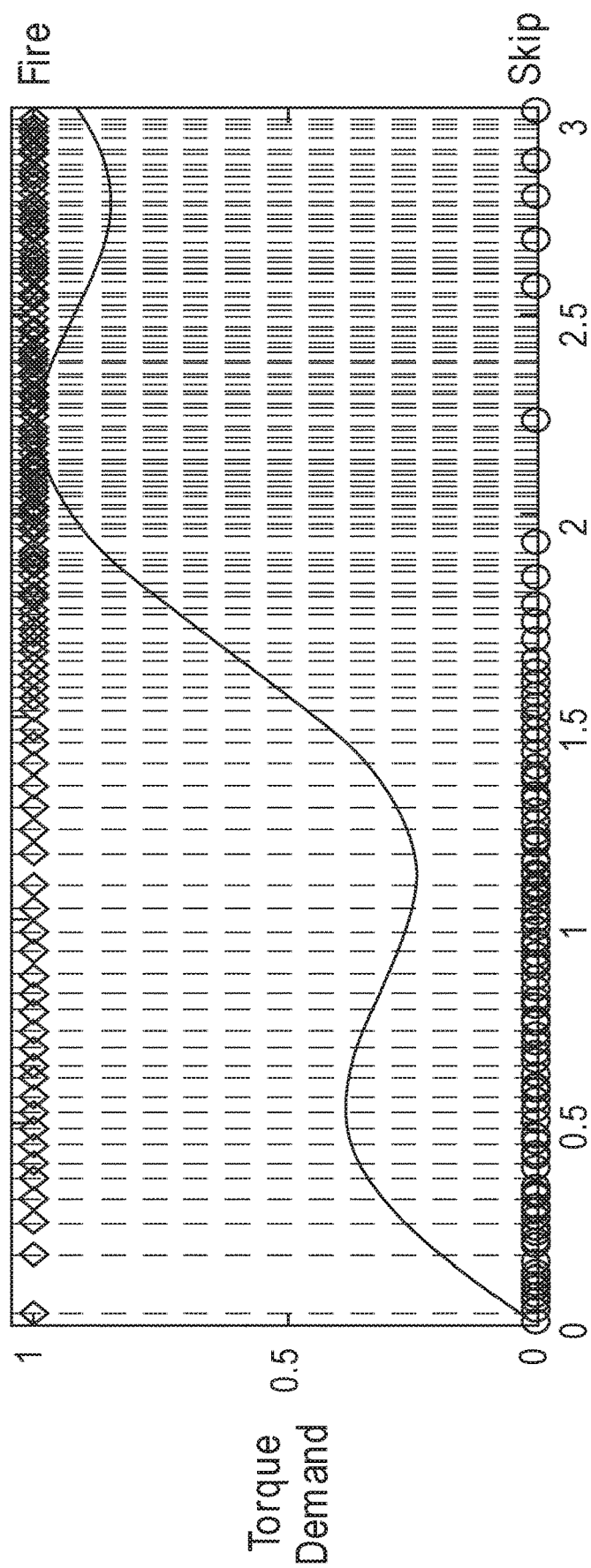
FIG. 1 is a graph illustrating cylinder firing frequency as a function of torque demand for a Dynamic Skip Fire (DSF) controlled internal combustion engine.

Referring to FIG. 1, a graph illustrating cylinder firing frequency as a function of torque demand for a DSF controlled internal combustion engine in shown. As the DSF controller selectively deactivates cylinders, fuel economy may be significantly improved by minimized pumping losses as fewer cylinders are operating at their peak efficiency to deliver the varying torque demands. This relationship is illustrated in FIG. 1, which shows firing density versus torque demand. As the torque demand decreases, the density of firing cylinders also decreases. As a result, the fuel efficiency gains of DSF operation are greater at low torque demands and low firing densities.

Neural Network Model

Neural networks are computing systems that "learn" to perform tasks by considering examples, generally without being programmed with any task-specific rules. Common applications of neural networks include image recognition, speech recognition and natural language processing. With each application, the neural network "learns" from known examples of a subject and then automatically applies this learned knowledge to identify unknown examples of the same or similar subjects. For example, neural networks that learn from known examples of images, speech or natural language utterances learn to recognize unknown examples of images, speech and natural language utterances respectively.

Figure 2:
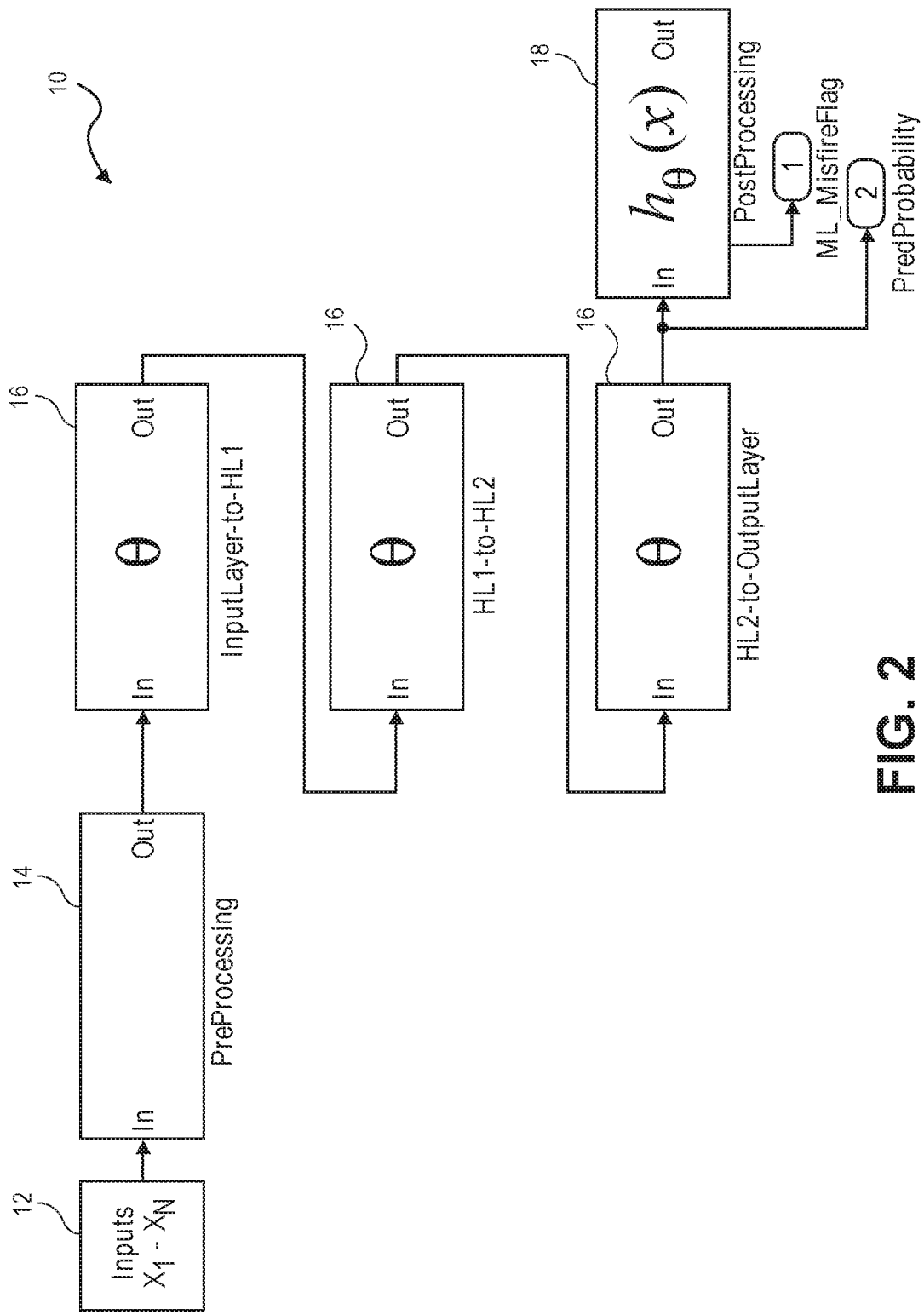
FIG. 2 is a block diagram of an exemplary neural network used in non-exclusive embodiment of the present invention.

Referring to FIG. 2, a model of a neural network 10 that can be used for skip fire detection with a DSF operated engine is shown. The model of the neural network 10 includes an input layer 12, an input pre-processing layer 14, one or more "hidden" layer(s) 16 and an output layer 18. The input layer 12 defines a number of inputs ($X_1$, $X_2$, $X_3$ ... $X_N$). The input pre-processing layer normalizes the inputs. Each of one or more hidden layers 16 ($HL_1$ to $HL_N$) includes a number of processors ($\Theta_1$, $\Theta_2$, $\Theta_3$, ... $\Theta_N$) for implementing functions. Each of the hidden layers 16 is arranged to receive inputs from previous layer and provide processed outputs to the next layer. For instance, the first hidden layer $HL_1$ receives pre-processed inputs ($X_1$, $X_2$, $X_3$ ... $X_N$) respectively and provides outputs to the second hidden layer $HL_2$. The second hidden layer $HL_2$, after processing the inputs, provides its output to the next hidden layer $HL_3$. The third hidden layer $HL_3$ processes the its inputs and provides its output to the output layer 18, which performs further post-processing on the outputs generated by hidden layers 16. In various embodiments, as described in more detail below, the output layer generates (a) a misfire detection probability output or (b) a misfire flag.

In the model shown, only three tiers of hidden layers 16 are shown for the sake of simplicity. It should be understood that with many neural networks, any number of tiers may be used. Each successive tier of processors $\Theta$ receive inputs from the outputs of the preceding tier of processors $\Theta$. The output layer 18 includes one or more processors $\Theta$, which generate the final outputs or answers of the neural network 10. Neural networks 10 are typically initially trained, which consists of providing large amounts of input data to the input layer 12 and telling the neural network what the outputs should be. In response, the neural network 10 adapts and learns.

To initiate the machine learning process, the input data was preprocessed by the input layer 12. In a non-exclusive embodiment, a min-max normalization technique was applied so that all of the data was scaled from −1 to +1. The data was divided into training, validation and test sets in a ratio of 70%-15%-15% respectively for 3-fold cross-validation purposes. It should be understood that dividing the data up into different categories and ratios is exemplary and should not be construed as limiting. In other embodiments, any number or type of categories and/or ratios may be used.

The neural network hypothesis $H_{w,b}(x)$ is then computed by the forward propagation algorithm. The inputs and the outputs of the layer are related by a transformation function:

$$\begin{bmatrix} 1 \\ \theta(s^{(l)}) \end{bmatrix}$$

where $\theta(s^{(l)})$ is a vector whose components are $\theta(s_j^{(l)})$. The signal going into node j in layer l is $s_j^{(l)}$ and is the weighted sum of the outputs from the previous layer's (l−1) activation function which forms the input for the next layer, l. This is represented as:

$$sl=(Wl)>x(l-1)$$

where weights are specified as $W^{(l)}$. A bias term (intercept) is also added as an extra feature to the input layer denoted as $x_0$, where $x_0=1$.

In various embodiments, the activation function performed by the processors $\Theta$ of the hidden layer(s) 16, can be either: sigmoid, hyperbolic tangent ("tan h"), or Rectified Linear ("ReLU"), etc.

For the output layer 18, the processor(s) $\theta$ is/are usually set to identity function for regression models or a sigmoid to calculate probability scores for classification models. $H_{w,b}(x)$ is the final hypothesis and w, b are weights and biases respectively.

Activation Functions

In non-exclusive embodiments, tan h and ReLU functions were used for the regression model and the classification model respectively.

Figure 3:
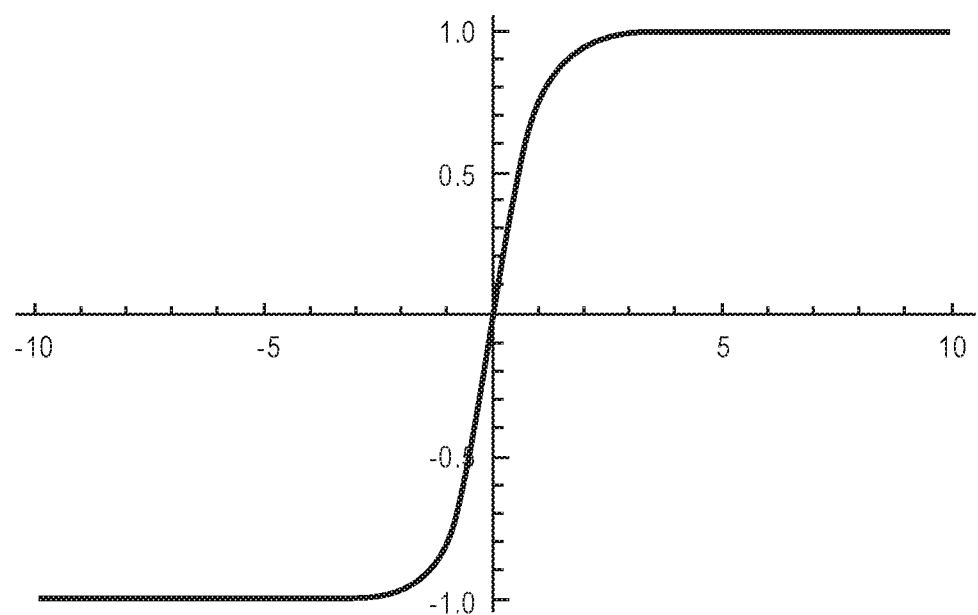
FIG. 3 illustrates a hyperbolic tangent ("tan h") function used by the neural network in accordance with a non-exclusive embodiment of the invention.

Referring to FIG. 3, a plot of the hyperbolic tangent ("tan h") function is shown. In this example, the mathematical formula used is tan h(x)−2σ(2x)−1. An attribute of the hyperbolic tangent function is that, for any input, it outputs a number between 1 and −1. In some situations, the non-linearity of the hyperbolic tangent function is preferred over sigmoid non-linearity due to its zero centered properties. However, the hyperbolic tangent function also suffers from saturation.

Figure 4:
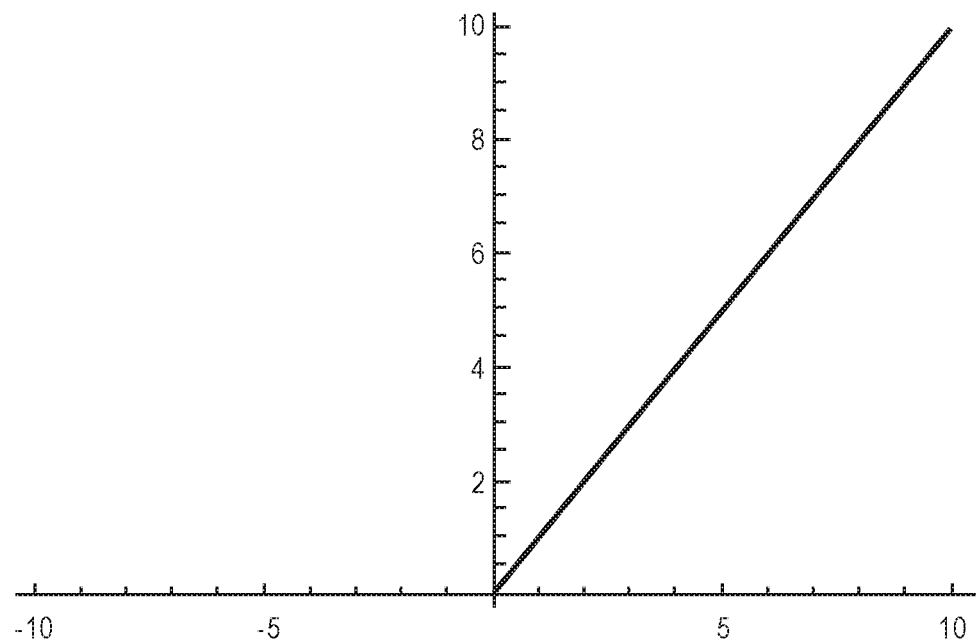
FIG. 4 illustrates a rectified linear ("ReLU") function used by the neural network in accordance with a non-exclusive embodiment of the invention.

Referring to FIG. 4, a rectified linear ("ReLU") function is shown. The mathematical formula used is $f(x)=\max(0, x)$. It performs better when compared to tan h/sigmoid activation functions as it accelerates the convergence of stochastic gradient descent.

In order to ensure that both algorithms yield accurate predictions, their performance was rated based on the loss function. For a regression based model, a sum of the squared loss function was minimized. For a classification model, a cross entropy loss or log loss was minimized. With the latter function, the lower the values, the better the approximation and generalization towards the final model (keeping overfitting in mind). In other words, the squared loss is represented by:

$$\frac{1}{2m}\sum_{i=1}^{m}(\hat{y}_i - y_i)^2$$

where the log-loss equals:

$$-\frac{1}{N}\sum_{i=1}^{N}[y_i \log p_i + (1-y_i)\log(1-p_i)]$$

The loss function was reduced by using a dynamic programming algorithm known as back-propagation. This technique allows computation of the partial derivatives of the loss function with respect to every weight. Derivatives indicate how sensitive the whole expression is with respect to each of the variables acting upon it. The chain rule is applied inductively, writing the partial derivatives in layer L using the partial derivatives in layer (L+1).

An initial weight was chosen to prevent convergence to local minimums. Weights were assigned to a small non-zero value as there will be no source of asymmetry and no learning will happen when the weight is set to zero. As a result, it is advantageous to randomly initialize weights.

However, one of the drawbacks of this approach is that the output distribution of neurons in the network will have very small variances, and as a result, will tend to reduce the gradients during back-propagation causing a slow convergence and a less than ideal generalization. For more details on this technique, see Glorot, X. and Bengio, Y., "*Understanding the difficulty of training deep feed forward neural networks.*," In Proceedings of AISTATS 2010, volume 9, pp. 249256, May 2010, which is incorporated by reference in its entirety for all purposes.

A normalized initialization is useful in improving the convergence rate. In a non-exclusive embodiment, the following initialization step may be used:

$$W \sim U\left[\frac{-\sqrt{6}}{\sqrt{n_j + n_{j+1}}}, \frac{\sqrt{6}}{\sqrt{n_j + n_{j+1}}}\right]$$

where U [−a, b] is the uniform distribution in the interval, [−a, b] and $n_j$ and $n_{j+1}$ are the sizes of the previous layer and next layer respectively.

The above-described protocol may be used for both tan h and ReLU activations.

In order to determine the value of weights which minimizes the loss function, two techniques were used to solve this optimization problem: Stochastic Gradient Descent (SGD) and Limited memory BFGS (L-BFGS) for the classification and regression method respectively. SGD is from the class of gradient descent where instead of performing a batch gradient descent on the entire dataset, mini-batches of the dataset are taken and gradient updates are performed only on those at a time. SGD is most common way for minimizing the neural net loss functions. L-BFGS is from the family of quasi-Newton methods which is an improvement over BFGS technique in terms of space and time. However, a disadvantage of L-BFGS is that it has to be computed over the entire training set causing longer training time. During training, it was determined that L-BFGS performed better than SGD for the regression based method.

Machine Learning Algorithms

In different embodiments, two different machine learning methods are described. The first method is regression-based and involves predicting the angular crank acceleration. The second method is classification-based, meaning misfire flags are predicted. It should be understood that the misfire detection as described herein is not necessarily limited to neural network algorithms. In yet other embodiments, other algorithms such as a Decision Tree or other Ensemble algorithms may be used.

Regression Based Machine Learning Embodiment

With the regression-based machine learning model, the expected crank acceleration is calculated from a number of inputs, including the skip fire sequence. Once the expected crank acceleration is calculated, it is compared to a measured crank acceleration. The outcome of the comparison is used to predict a misfire.

Figure 5:
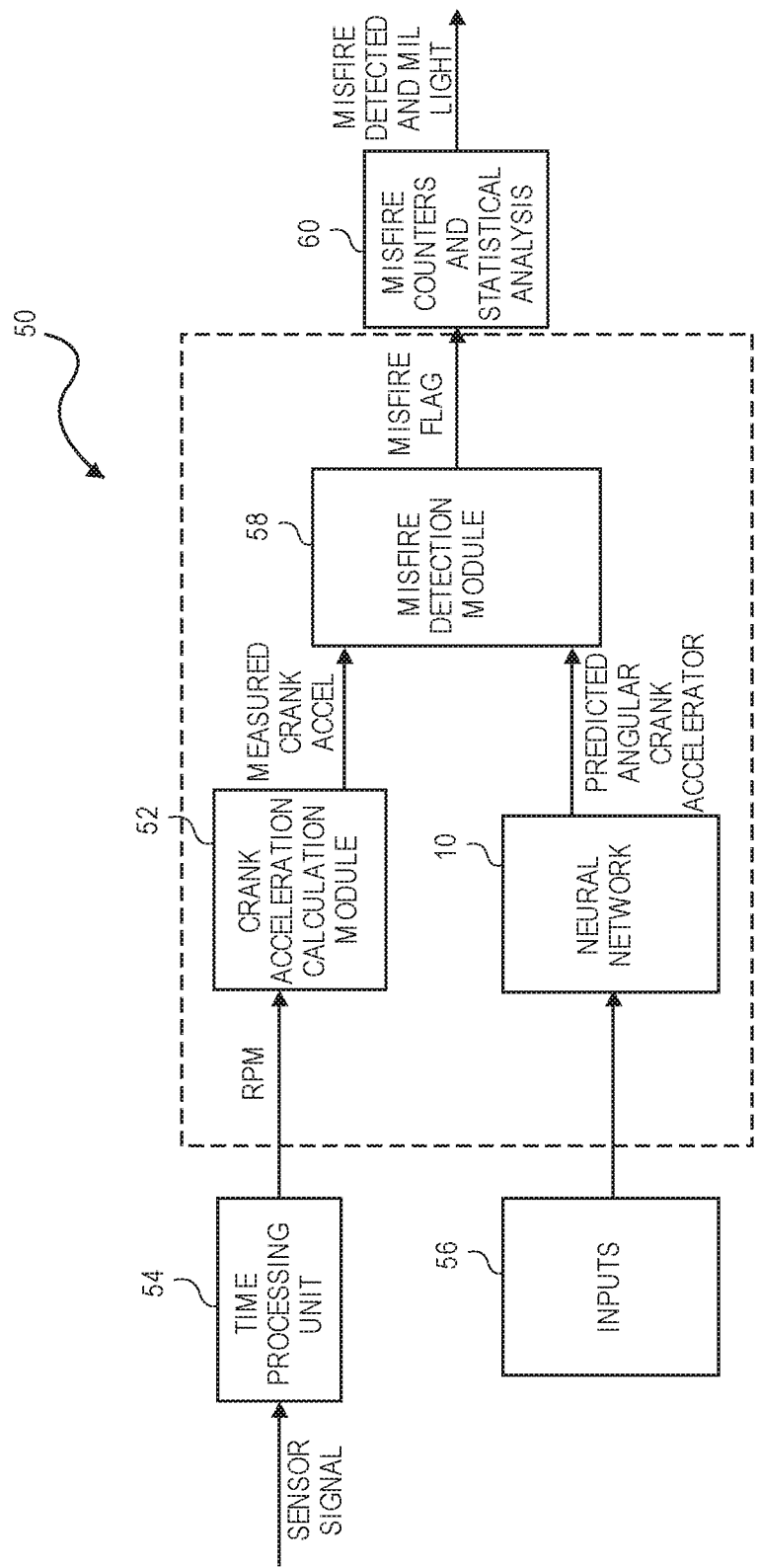
FIG. 5 illustrates a schematic block diagram for implementing regression-based machine learning for misfire detection in accordance with a non-exclusive embodiment of the invention.

Referring to FIG. 5, a schematic black diagram 50 for implementing regression-based machine learning for misfire detection is illustrated. The logic diagram 50 includes a crank acceleration calculation module 52, a time processing unit 54, a misfire detection module 58, neural network 10, and an optional misfire counter and statistical analysis module 60. The neural network 10 is arranged to receive a number of inputs 56 (see table I below), The measured angular crank acceleration is a measure of the force used to push a piston down within its cylinder during a power stroke. With strong or weak combustion, the rotational speed of the crank will increase or decrease respectively. In a non-exclusive embodiment, the angular crank acceleration is measured by using the sensor to measure the crank angle as a function of time. From this information, the acceleration of the piston from at or near Top Dead Center (TDC) of the power stroke to the middle or end of the power stroke, when most of the power resulting from combustion has been delivered to the engine, can be determined.

The time processing unit 54 receives a signal from a sensor, such as a square wave, with the spacing between pulses indicative of the vehicle crank shaft angular velocity. In response, the time processing unit 54 provides a Revolutions Per Minute (RPM) signal indicative of the measured rotational speed of the crankshaft to the crank acceleration calculation module 52. The crank acceleration calculation module 52 provides a measured angular crank acceleration value to the misfire detection module 58. In non-exclusive embodiments, the sensor is a Hall-effect sensor. In other embodiments, other types of sensors may be used.

Figure 6:
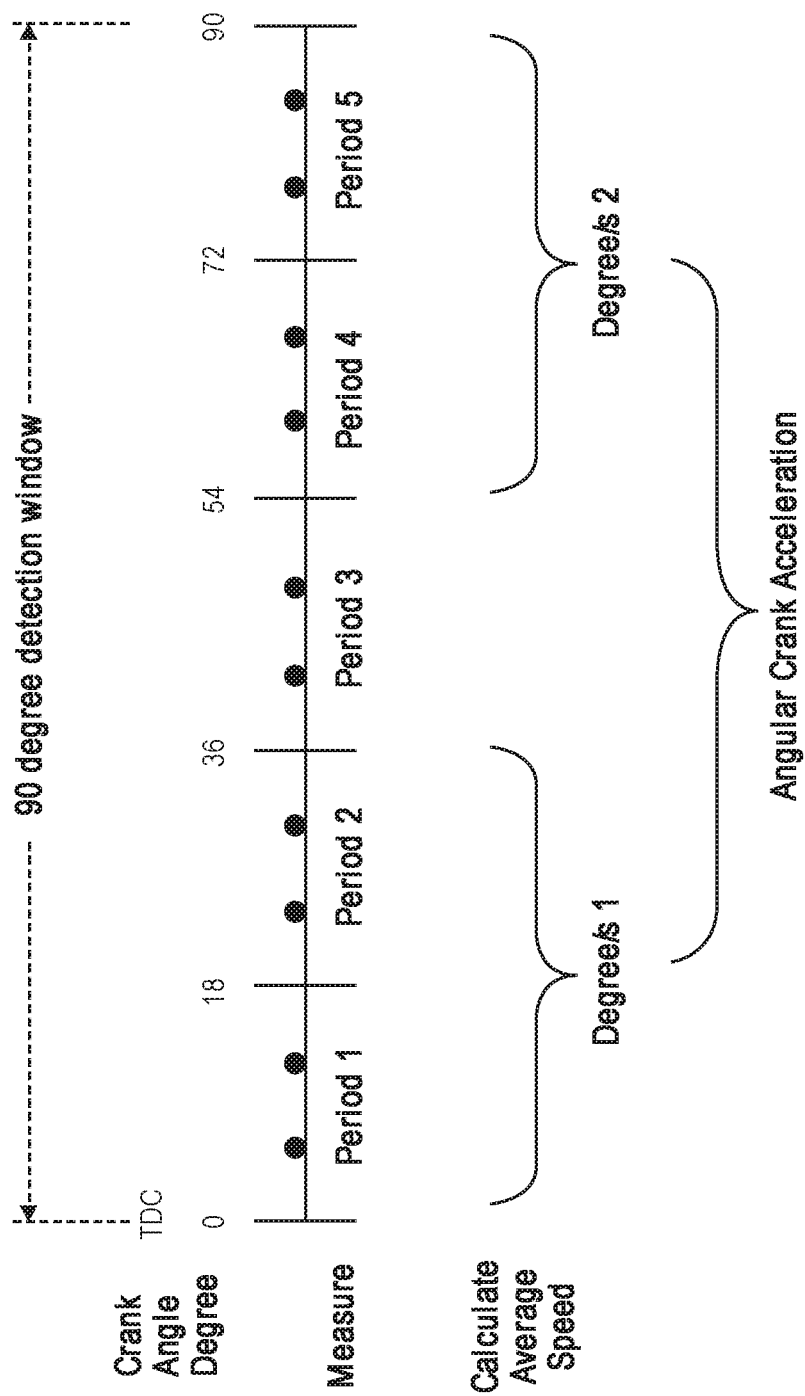
FIG. 6 depicts how angular crank acceleration for an exemplary four-cylinder engine is calculated in accordance with a non-exclusive embodiment of the invention.

Referring to FIG. 6, the calculation performed by the calculated crank acceleration calculation module 52 for an exemplary four-cylinder engine is depicted. The calculation is performed over a 90-degree moving window and is updated every six (6) crank degrees (each crank tooth). The 90-degree window is further divided into five 18-degree periods. The first two periods are averaged to obtain first angular velocity ("degrees/s 1") and the last two segments are averaged to obtain the second angular velocity ("degrees/s 2"). The angular acceleration may be determined by subtracting the first angular velocity from the second angular velocity and dividing by the time between the two measurements.

In non-exclusive embodiments, the calculated crank acceleration is then filtered by a band-pass filter to improve signal clarity by excluding noise sources outside of the frequency of interest. The resulting signal is then latched every cylinder event (180 crank degrees for a 4-cylinder engine) at a location corresponding to its peak crank acceleration values.

The degree window, number of degrees per period, number of periods, etc. all may vary from engine to engine and are not limited to those depicted in FIG. 6. With different engines, working chambers or cylinders, different sizes, etc., each of these parameters may vary accordingly. Furthermore, the above-described embodiment is just one of many possible methods or techniques that can be used for measuring angular crank acceleration. FIG. 6 should therefore be considered as merely exemplary and should not be interpreted as limiting in any manner.

Referring again to FIG. 5, the neural network 10 is arranged to receive a plurality of inputs ($X_1, X_2, X_3 \ldots X_N$) as noted above. Such inputs may be specific to the vehicle in which the misfire detection is performed. Such vehicle-specific inputs may include (a) the displacement of the engine, (b) the configuration of the engine (e.g., inline, straight, V etc.), (c) the peak power of the engine, (d) the peak torque of the engine, (e) transmission type, (f) valve train type (e.g., Dual Overhead Cam, cam-in-block, etc.) and (g) the mechanism(s) used by the engine for cylinder deactivation.

In non-exclusive embodiments, Table I provided below provides a non-exhaustive list of additional possible inputs and their minimum and maximum values, which may be normalized by pre-processor 14 to have the same scale between (−1) and (1).

It is further noted that the input parameters include both those that are common with conventional engines and others that are unique to DSF engines, such as Fire Skip Status, Fire Enable Flag, Cylinder Skip Number, Order Skip Number and DCCO Exit Flag. These terms are defined in more detail below.

TABLE I

List of Input Variables for Regression Model

| # | Input Variable | Units | Min | Max |
|---|---|---|---|---|
| 1 | Spark Timing | deg | 0 | 30 |
| 2 | Fuel Mass | mg | 0 | 40 |
| 3 | Fire Skip Status | — | 0 | 15 |
| 4 | Fire Enable Flag | — | 0 | 1 |
| 5 | Cylinder Skip Number | — | 0 | 50 |
| 6 | Order Skip Number | — | 0 | 80 |
| 7 | Mass Air per Cyl | gram/stk | 0 | 0.6 |
| 8 | Cam Phaser Timing | deg | −60 | 0 |
| 9 | Charge Air Temp | deg C. | 12 | 52 |
| 10 | Engine Speed | rpm | 500 | 3000 |
| 11 | MAP | kPa | 0 | 150 |
| 12 | Gear | — | 1 | 8 |
| 13 | DCCO Exit | — | 0 | 1 |
| 14 | Vehicle Speed | mph | 0 | 80 |
| 15 | Torque Request | Nm | 0 | 260 |
| 16 | Pedal Position | % | 0 | 80 |
| 17 | Throttle Position | % | 0 | 50 |
| 18 | Fuel Pressure | kPa | 10 | 240 |
| 19 | Turbo WG Position | % | 0 | 65 |

The Fire Skip Status is a parameter to indicate whether each of the four cylinders is a fire or a skip cycle at a particular time. It is defined as:

$$\text{Fire Skip Status} = FS_{N-2} \times 2^3 + FS_{N-1} \times 2^2 + FS_N \times 2^1 + FS_{N+1} \times 2^0$$

where:

$FS_N$ is Fire Enable Flag of the cylinder of interest which is coded as 1 for a firing cycle and 0 for a skip cycle;

$FS_{N+1}$, $FS_{N-1}$ and $FS_{N-2}$ are Fire Enable Flags for the next cylinder, the previous cylinder and the opposing cylinder, respectively.

Fire Skip Status, which is a weighted value ranging from 0 to 15 in a non-exclusive embodiment. With DSF operation, the various possible DSF patterns affects the crank acceleration in a slightly different way. Each possible DSF pattern is thus assigned a weighted value between 0 (all cylinders are skipped) and 15 (all cylinders are fired.

Cylinder Skip Number is defined as the number of skips preceding each firing for each cylinder in its own firing history;

Order Skip Number is the number of skips preceding each firing in the firing order.

DCCO Exit Flag is a flag to indicate whether it is an air pump-down event where the valves are open normally without fuel injection to reduce intake manifold pressure following Deceleration Cylinder Cut-Off (DCCO) events.

The above input parameters are critical variables for the machine learning algorithms for DSF engines since the crank acceleration at any particular point in time is significantly impacted by these parameters.

In a non-exclusive embodiment, the neural network 10 includes two hidden layers. The number of processor or "neurons" of each hidden layer may be optimized based on the training data set using a Limited-memory BFGS (L-BFGS) technique, as is well known in the machine learning art.

In the non-exclusive implementation, there the first layer includes twenty-three (23) and eleven (11) processors Θ for the second hidden layer. Further with this embodiment, each processor Θ of both hidden layers used the tan h activation function. The best hyper-parameter was decided based on the validation error recorded by a three-fold cross validation through multiple runs. Based on the training data set, the model provides a set of weights and biases which are used to predict crank acceleration. It should be understood that the number of hidden layers and the number of processors Θ for each hidden layer specified herein are merely exemplary and should not be construed as limiting in any manner. On the contrary, the neural network 10 may include any number of hidden layers, each having any number of processors Θ.

Figure 7:
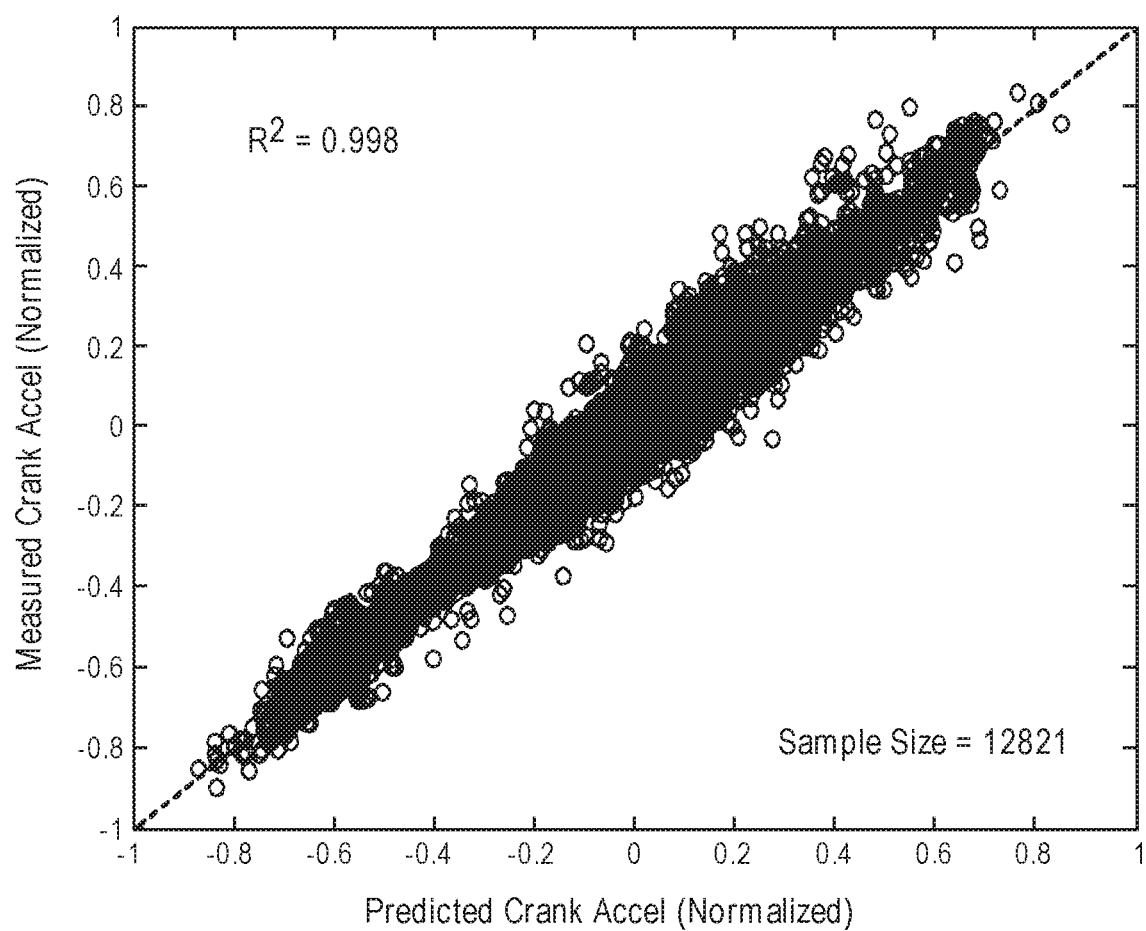
FIG. 7 is a plot showing a comparison between predicted and measured crank acceleration generated during training of an exemplary neural network used in a non-exclusive embodiment of the invention.

Referring to FIG. 7, a curve-fitting plot showing the comparison between the predicted and measured crank acceleration for the training data used to train the neural network 10 is shown. The figure illustrates that the predicted crank acceleration agrees with measured crank acceleration reasonably well with a $R^2$ of 0.998.

The misfire detection module 58 compares the predicted angular crank acceleration obtained from the neural network 10 to the measured crank acceleration as described from the crank acceleration calculation module 52 to determine whether a misfire has occurred. Misfires are determined using a parameter herein referred to as a Misfire Detection Metric (MDM), which is defined as:

$$MDM = (1 + (\text{CrankAccel}_{expected} - \text{CrankAccel}_{measured} / \text{CrankAccel}_{Normalizing}) - B)^3$$

To make the DM parameter dimensionless, a normalizing crank acceleration, which is a moving average of modeled crank acceleration of only firing cycles, is used as denominator. B is a constant to bias the signal in order to center the detection threshold to be around 1. The result is then raised to the power of three (3) to amplify the signal to noise ratio. By using this normalized metric, the threshold no longer depends on speed or torque, which eliminates the need for speed/load-based look-up tables.

When the MDM metric exceeds a threshold, it is determined that a misfire has occurred. If the MDM metric falls below the threshold, then it is determined that no misfire has occurred.

In an optional embodiment, the misfire counter and statistical analysis module 60 is arranged to count the number of detected cylinder misfires while the engine is operating in DSF mode. As a general rule, the driver or other systems on the vehicle, such as an On-Board Diagnostic (OBD) system is/are preferably not notified every time a misfire is detected. The module 60 is therefore optionally used to count the number misfire detections and/or apply statistical analysis, and then generates a notice if a predefined threshold value is exceeded. For example, the threshold value may be an absolute number (e.g., 5, 10, 15, 25, etc.) of misfires or a certain percentage of misfires per number of firing opportunities (e.g. 1%, 5%, 10%, etc.). In either case, when the threshold value is exceeded, a notification is generated.

Classification Based Embodiment for Predicting Misfires

With the classification-based model, machine learning is used to directly predict misfire flags.

Figure 8:
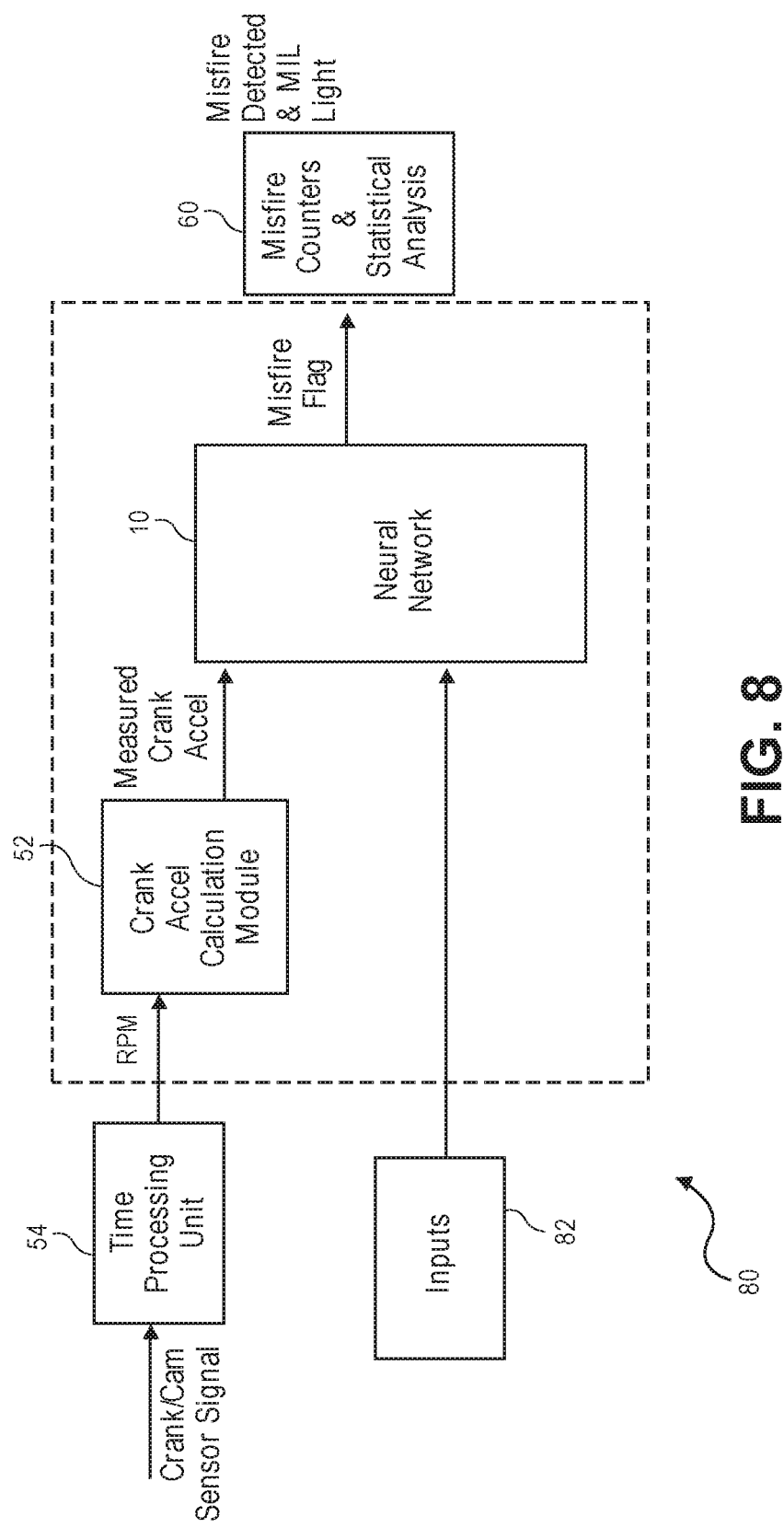
FIG. 8 is a schematic diagram of a misfire detection unit in accordance with a non-exclusive embodiment of the invention.

Referring to FIG. 8, a-block diagram of a misfire detection unit 80 for implementing classification-based machine learning for misfire detection is illustrated. The misfire detection unit 80 includes a crank acceleration calculation module 52, a time processing unit 54, a neural network 10 arranged to receive a number of inputs 82, and a misfire counter and statistical analysis module 60. As elements 52, 54 and 60 were previously described, a discussion of their operation is not repeated herein for the sake of brevity.

The inputs 82 to the neural network 10 for the classification-based model are similar, although not identical to, those of the regression-based model. With this embodiment, the inputs 82 include a combination of (a) the vehicle-specific inputs noted above, (b) the inputs listed in the Table I provided above and (c) an additional input variable, the crank acceleration as expressed in degrees/second$^2$ or other appropriate units and having a minimum and maximum value. In a non-exclusive embodiment, these minimum and maximum values are −80,000 deg/s$^2$ and 180,000 deg/s$^2$ respectfully. It should be noted that these values are exemplary and should not be construed as limiting. Other values ranging from −150,000 deg/s$^2$ to 400,000 deg/s$^2$ may be used depending on a number of circumstances, such as the type of vehicle, type of internal combustion engine, etc.

In a non-exclusive embodiment, the neural network 10 used for the classification-based model includes two hidden layers. The first hidden layer includes twenty-three (23) processors Θ and the second hidden layer uses four (4) processors Θ. The processors Θ of both hidden layers are optimized for training data and use a Stochastic Gradient Descent (SGD) technique. Each of the processors Θ of both hidden layers also implements the ReLU activation function. In this implementation, the learning rate is kept constant as long as the training loss keeps decreasing. If the training loss does not improve within a certain tolerance for two consecutive epochs, the learning rate was then divided by five.

The output from the output layer of the neural network 10 is a probability score between 0 and 1. This score can be regarded as Misfire Probability which is used to classify each data point as a misfire or non-misfire point based on whether or not its value is greater than or less than 0.5 respectively. It should be understood that the values provided herein are merely exemplary and should not be construed as limiting as other values may be used.

The classification model offers a number of advantages. Although the regression-based machine learning approach described above can correctly identify misfires under almost all conditions, the process involves comparing the predicted crank acceleration with the measured crank acceleration and requires calibration efforts to specify appropriate thresholds for various firing skip sequences. With the classification model, the need to calibrate is eliminated or significantly reduced.

Vehicle Tests

The development of misfire detection on a DSF engine was carried out on a Volkswagen Jetta vehicle equipped with a four-cylinder 1.8-liter turbocharged GDI (Gasoline Direct Injection) engine. The valve train of the engine and the engine controller were modified so that the test engine is capable of deactivating all four cylinders individually.

To conduct the test, the engine control unit of the vehicle was modified so that any firing density or firing sequence under steady state or transient driving conditions could be specified. This allows test data to be collected at all engine operating conditions for model development and validation.

Misfire generation code was developed for the engine controller to allow simulated misfires to be induced at any specified frequency for any given cylinder. Misfires are simulated by not injecting fuel for a cylinder that is otherwise scheduled to fire. This approach approximates a misfire from a torque and valve state standpoint, but protects the catalyst of the vehicle from potential damage by avoiding large amounts of unburnt hydrocarbons flowing into the converter.

The vehicle was driven on public roads at quasi steady state or a normal driving pattern for data collection. A large amount of vehicle data with and without induced misfires is collected by driving the vehicle on public roads. The signals recorded in the datasets include commanded fire skip sequence and induced misfire commands in addition to vehicle speed, engine speed, intake manifold pressure, cam position, etc. The crank acceleration signal was calculated based on crankshaft angular speed or crank periods generated from a production 60-2 teeth crank trigger wheel. The data was then fed into a machine learning algorithm as described herein.

Both the regression-based and the classification-based algorithms were validated with two sets of vehicle test data. The validation data sets were collected from two vehicle test drives with misfire induced at either a predetermined frequency (test 1) or in a randomized pattern (test 2). Both test drives included a number of idle and quasi steady state driving periods, as well as acceleration and deceleration transient maneuvers.

Test Results—Regression Model

FIGS. 9 and 10 are confusion matrices showing the validation results of the regression model. A confusion matrix, also known as an error matrix, allows visualization of the performance of an algorithm in terms of Probability of Detection (true positive), Type I Error Rate (false negative), Type II Error Rate (false positive), Specificity (true negative), and F1 score. F1 score is the harmonic mean of Precision and Probability of Detection, also known as Recall:

$$F1 \text{ Score}=2/((1/\text{Precision})+(1/\text{Probability of Detection})),$$

where Precision is the ratio of true positives to total number of predicted positives, (i.e. the sum of true positives and false positives) and where Probability of Detection is the ratio of true positives to total number of actual positives in the population.

An F1 score over 0.9 indicates an excellent prediction by the model. The F1 scores from the implemented regression model for the two sets of validation data are 0.9197 and 0.9664, respectively.

Referring now to FIGS. 11 through 15, each of which shows a series of plots showing representative behavior of various parameters used to generate a misfire diagnostic signal under various operating conditions. Each of FIGS. 11 through 15 includes a five graphs, including:

Graph A, which shows the deliberately programmed misfires as a function of firing opportunity or equivalently cylinder event number;

Graph B, which shows the vehicle speed and fire (1) and no fire (0) decision associated with each firing opportunity;

Graph C, which shows the predicted crank shaft acceleration and measured crank shaft acceleration as a function of firing opportunity. The measured crank shaft acceleration may be the output of crank acceleration calculation module 52 shown in FIG. 5. The predicted crank acceleration may be the output of the neural network module 10 shown in FIG. 5;

Graph D, which shows the misfire metric and misfire threshold as a function of firing opportunity; and Graph E, which shows the misfire detection signal as a function of firing opportunity. A detected misfire is a logical 1 and when no misfire is detected the misfire detection signal is a logical 0. This signal may be the output of the misfire detection module 58 shown in FIG. 5.

It is also useful to note that in the embodiments depicted in FIGS. 11 through 15, the misfire metric threshold is set to one (1). See line 100 in Graph D in each of the figures. As depicted in the figures, when the MDM exceeds line 100 (MDM>1), a misfire is detected, whereas no misfire flag is detected when the MDM is less than one (1).

Figure 11:
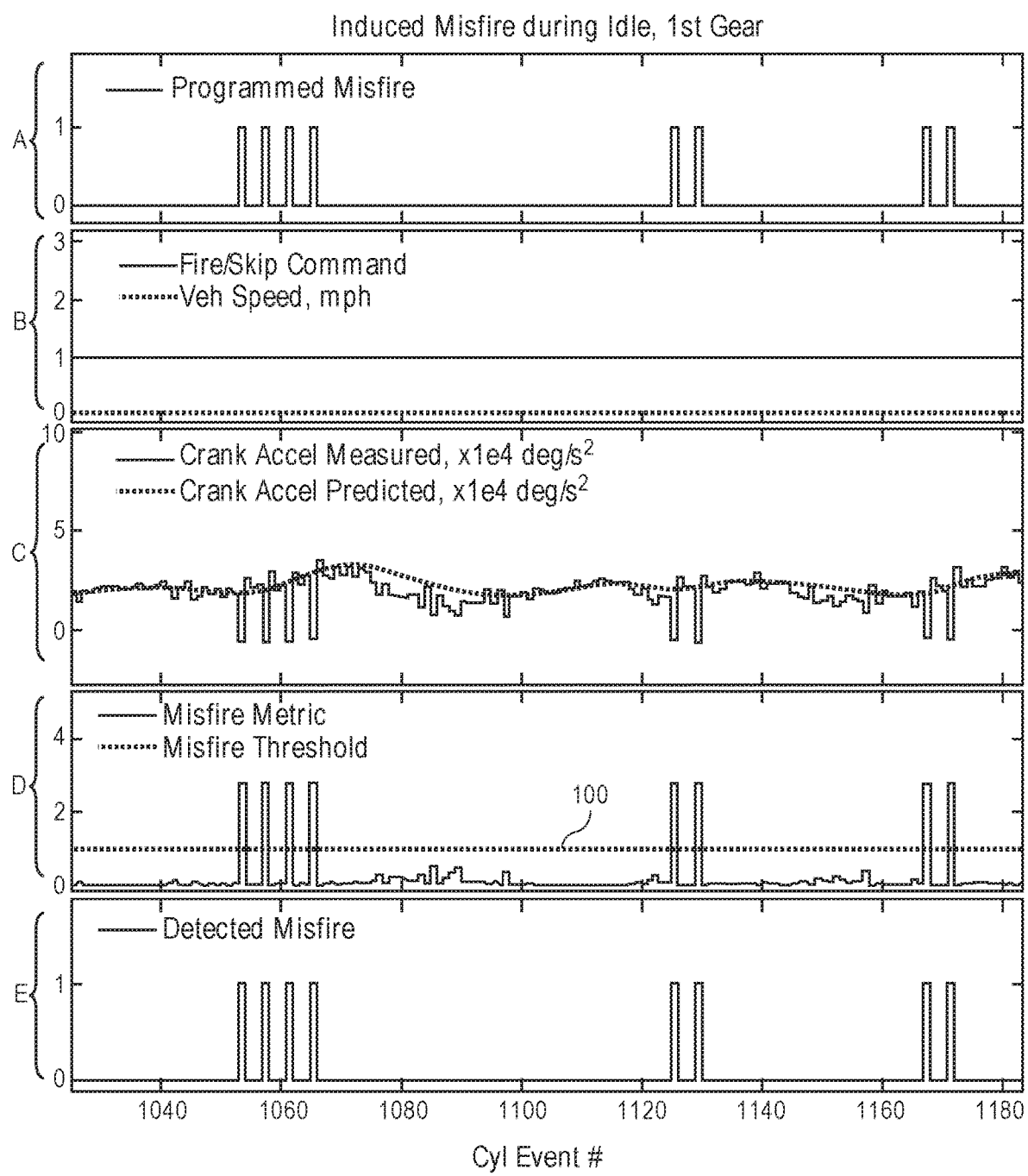
FIGS. 11-15 are plots showing representative behavior of various parameters used to generate a misfire diagnostic signal under various operating conditions.

FIG. 11 illustrates the misfire detection results at drive idle. As shown on the graph, at every induced misfire, the measured crankshaft angular acceleration drops significantly below the predicted crank acceleration, causing the Misfire Detection Metric (MDM) to spike above the preset threshold of one (1). By comparing the locations of programmed and detected misfire flags, shown in Graph A and Graph E, respectively, one can see that the algorithm is capable of detecting every induced misfire at this condition.

Figure 12:
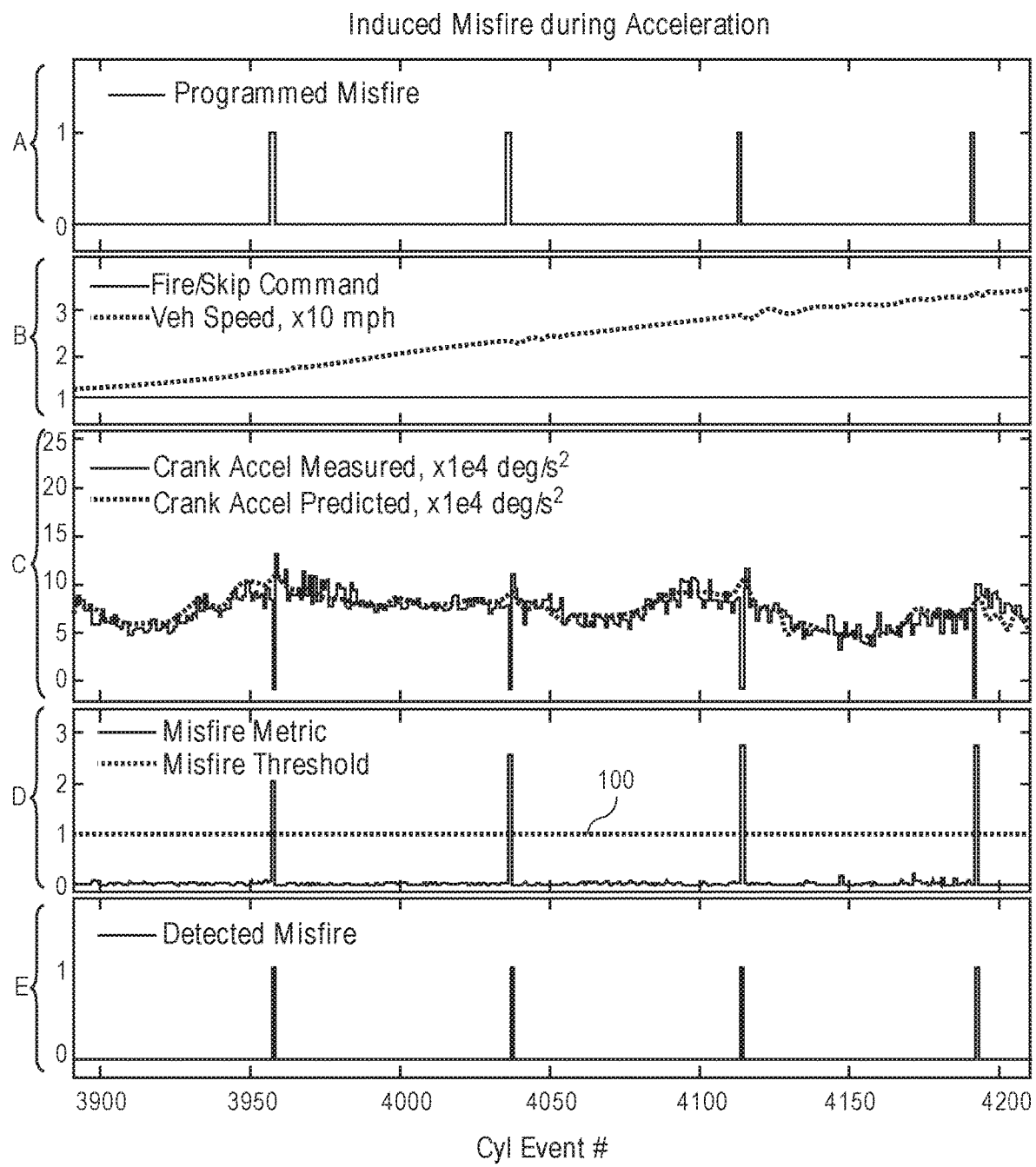
Figure 13:
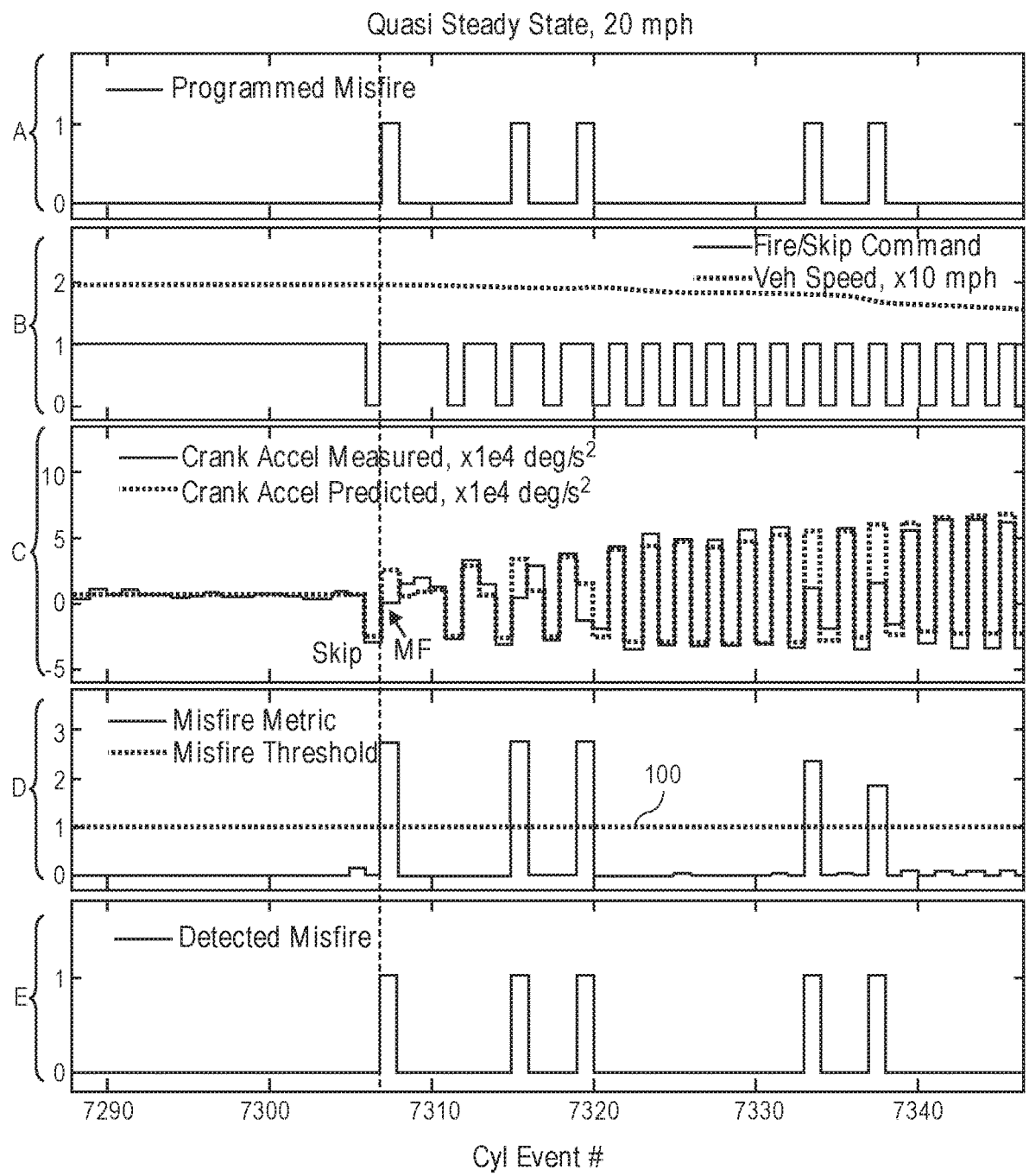
Figure 14:
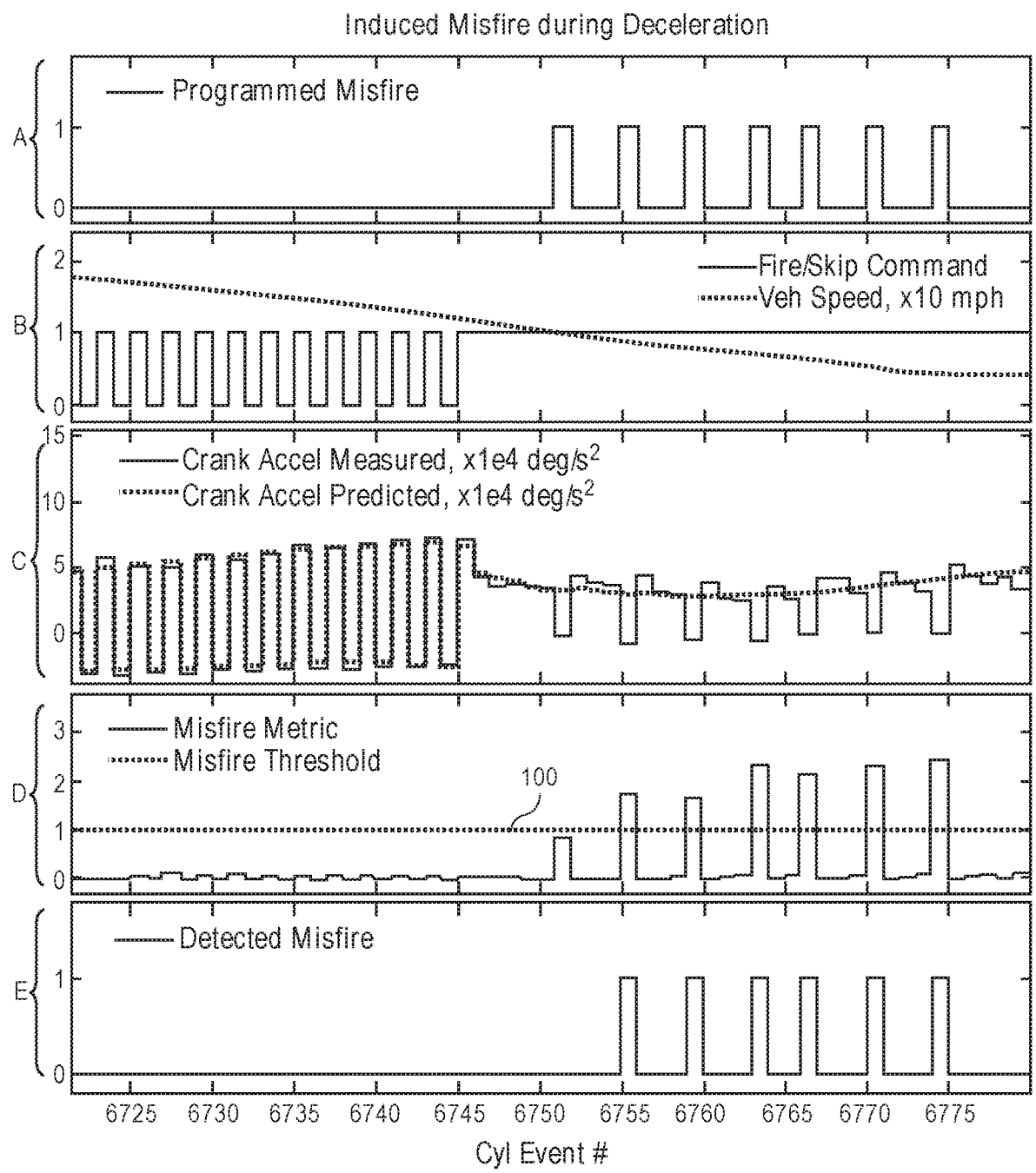

FIGS. 12, 13 and 14 show similar results as those in FIG. 11, but during acceleration, 20 mph quasi steady state cruising, and deceleration driving conditions, respectively. During the acceleration period shown in FIG. 12, the firing density is 1 which indicates all cylinders are firing. There were four misfires induced. The graph demonstrates that every induced misfire is successfully detected under this driving condition.

FIG. 13 shows a comparison between induced misfire flags shown in the top Graph A and detected misfire flags shown in the bottom Graph E during 20 mph cruising. The segment included a firing density transition from 1 to 0.5, shown in the second Graph B. The graph shows that the predicted crank acceleration (dashed curve in the third Graph C agrees with the measured crank acceleration reasonably well, not only for fired cycles, but also for skipped cycles, except for those cylinder events with induced misfire. This is also confirmed by examining the misfire metric (see Graph D) which stays essentially zero except for those spikes for induced misfire events. Again, all the induced misfires have been correctly identified under these conditions (see Graph E). As pointed out in the graph, it should be noted that the logic can accurately distinguish a skip from a misfire even though a skip may exhibit a much more significant crank acceleration drop than that caused by a misfire.

FIG. 14 illustrates an example of misfire detection results during vehicle deceleration conditions. Although there was one missed detection of the induced misfire, the metric was close to the preset threshold. Since the separation of metric values between misfires and non-misfires is quite large, a small adjustment of the threshold would have detected all induced misfires during this deceleration condition.

Figure 15:
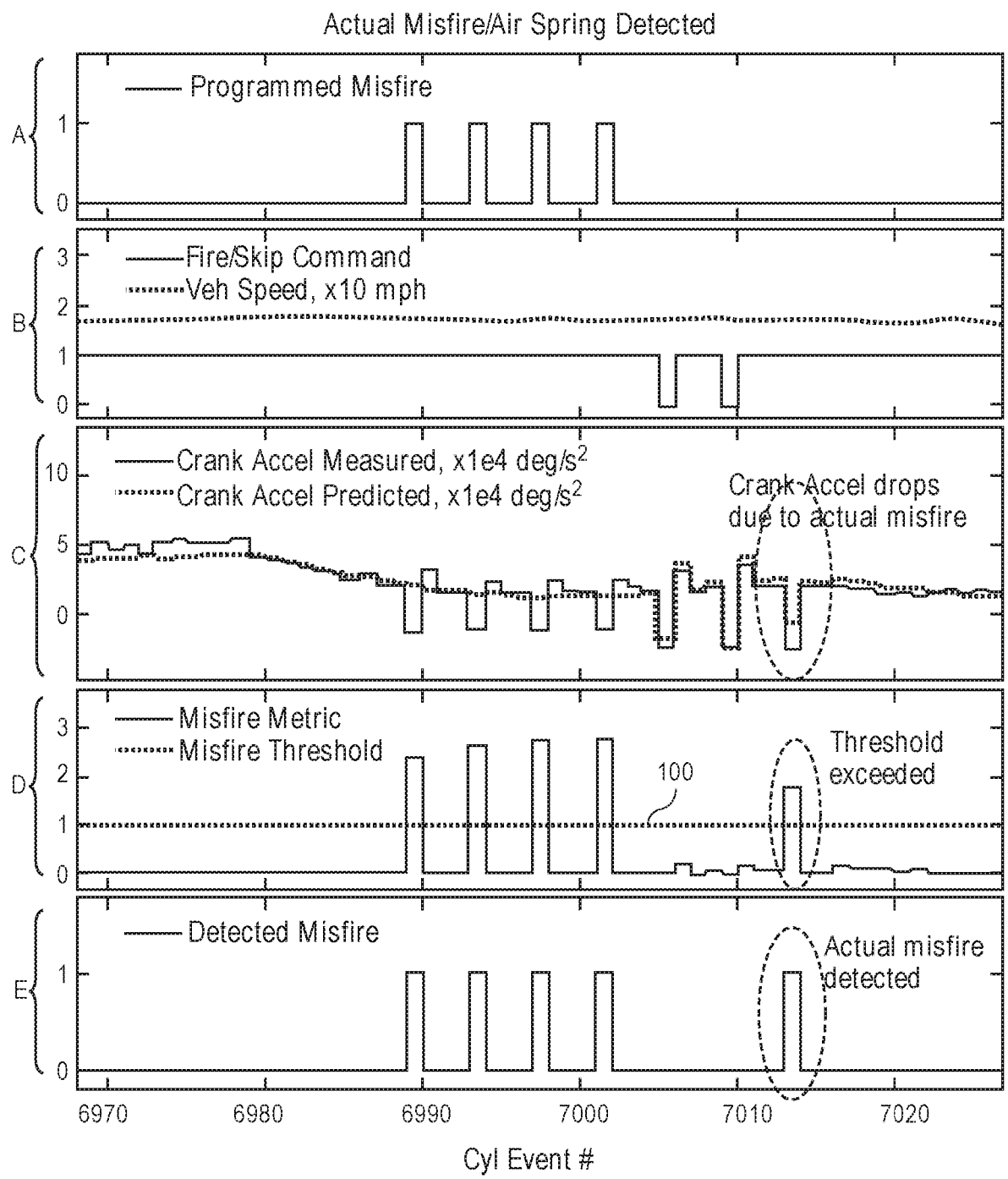

FIG. 15 depicts an example of scenarios where the algorithm successfully detected an actual misfire or air spring. An air spring is defined as a condition where all valves are functioning correctly, but there is no fuel injection commanded to that cylinder. The effects of air spring and misfire on crank acceleration are similar, except that, in an air spring situation, the algorithm would predict slightly lower crank acceleration than the misfire case because there was no scheduled fuel mass for the air spring. Examining the raw data of this test point confirms that the logic has correctly detected an actual misfire for this occurrence.

The regression-based approach thus proves to be a very accurate method for detecting misfires in a DSF engine.

Test Results—Classification Model

The same validation data sets used to validate the regression model were also used to validate this classification model. FIGS. 16 and 17 are the confusion matrices showing the validation results of the classification model. The graphs show that the classification algorithm yields an F1 Score of around 0.96 for both sets of validation data, indicting very good performance of the model.

Figure 18:
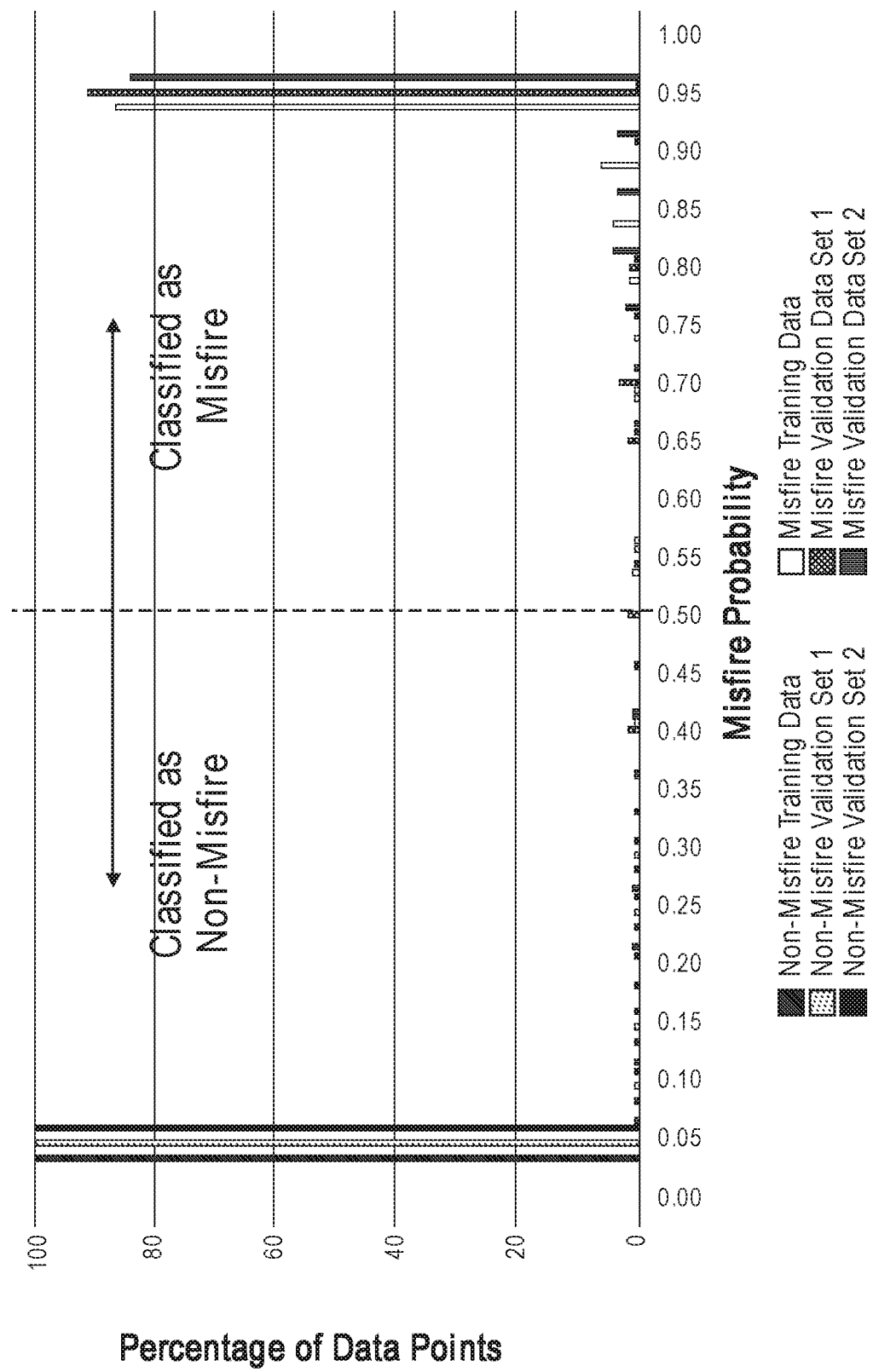

FIG. 18 presents detection results for the training data set as well as both sets of validation data. The x-axis is Misfire Probability which is the output from the Output layer depicted in FIG. 8. Those with the Misfire Probability of 0.5 and greater may be classified as misfire. Those with misfire probability less than 0.5 may be classified as non-misfire. The graph demonstrates that the model can correctly classify misfire and non-misfire conditions with high confidence. It shows that greater than 80% of all induced misfires are detected with 0.95 probability. For the rest of the induced misfires, majority of them are detected with higher than 0.75 probability. Conversely, the Misfire Probability for almost all non-misfire test points is 0.05. The misfire probability value is providing an accurate measurement of engine misfires.

Dynamic Multi-Level Skip Fire

In some applications, referred to as dynamic multi-level skip fire, individual working cycles that are fired may be purposely operated at different cylinder outputs levels—that is, using purposefully different air charge and corresponding fueling levels. By way of example, U.S. Pat. No. 9,399,964 describes some such approaches and is incorporated by reference herein for all purposes. The individual cylinder control concepts used in dynamic skip fire can also be applied to dynamic multi-charge level engine operation in which all cylinders are fired, but individual working cycles are purposely operated at different cylinder output levels. Dynamic skip fire and dynamic multi-charge level engine operation may collectively be considered different types of dynamic firing level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis. It should be appreciated that dynamic firing level modulation engine operation is different than conventional variable displacement in which when the engine enters a reduced displacement operational state a defined set of cylinders are operated in generally the same manner until the engine transitions to a different operational state.

The methods described above for DSF operation can be used with dynamic firing level modulation operation. To make the methods described above work with dynamic firing level modulation operation, data on misfire events may be collected while an engine is under dynamic firing level modulation operation. The previously described machine learning may analyze data in the same manner as previously described and detect misfires in an analogous manner.

Rolling Cylinder Deactivation

In dynamic skip fire and various other dynamic firing level modulation engine control techniques, an accumulator or other mechanism may be used to track the portion of a firing that has been requested, but not delivered, or that has been delivered, but not requested. However, the described techniques are equally applicable to engines controlled using other types of skip fire or firing level modulation techniques including various rolling cylinder deactivation techniques, where cylinders are fired and skipped in a predefined "rolling pattern". For example, a three-cylinder engine operating at a firing density of ½, where each cylinder is alternatively fired and skipped on successive working cycles.

CONCLUSION

The present embodiments should be considered illustrative and not restrictive and the invention is not to be limited to the details given herein, but may be modified within the scope and equivalents of the appended claims.

What is claimed is:

1. A vehicle with an internal combustion engine and a crankshaft for translating motion of pistons of the internal combustion engine into rotation, comprising:
    a firing level modulation module arranged to operate the internal combustion engine at a reduced effective displacement that is less than full displacement of the internal combustion engine by selectively modulating torque outputs of a cylinder, the modulated torque outputs including either or both of:
    (a) no torque output by intentionally skipping and not firing the cylinder; and
    (b) one or more torque output level(s) generated by controlling firing of the cylinder; and
    a machine learning module arranged to detect a misfire of the cylinder by learning to differentiate between an actual misfire of the cylinder versus either or both of:
    (c) the no torque output resulting from the intentional skipping and not firing of the cylinder; and
    (d) the one or more torque output level(s) resulting from controlling the firing of the cylinder.

2. The vehicle of claim 1, wherein the machine learning module includes a neural network arranged to generate a predicted angular crank acceleration in response to receipt of one or more inputs indicative of operation of the vehicle in the firing level modulation mode.

3. The vehicle of claim 2, wherein the one or more inputs are selected from:
    (a) a Fire Enable Flag for a next cylinder, a previous cylinder, and an opposing cylinder, respectively;
    (b) a cylinder skip number which is a number of skips preceding each firing for each of the plurality of cylinders in its own firing history respectively;
    (c) order skip number which is a number of skips preceding each firing in the firing order;
    (d) a Deceleration Cylinder Cut-Off (DCCO) exit flag which indicates an air pump-down event where valves associated with each of the cylinders are selectively opened without fuel injection to reduce intake manifold absolute pressure following DCCO events;
    (e) a weighted value compensating for effects of different skip fire patterns on angular crank acceleration; and
    (f) a fire skip status.

4. The vehicle of claim 1, wherein the machine learning module includes:
    a crank shaft acceleration module arranged to ascertain a measured crankshaft acceleration of the vehicle;
    a neural network which predicts a predicted angular acceleration of the crankshaft in response to a plurality of inputs indicative of operation of the vehicle in the firing level modulation mode; and
    a misfire detection module that determines when the misfire occurs by comparing the measured angular acceleration with the predicted angular acceleration of the crankshaft.

5. The vehicle of claim 4, wherein the misfire detection module determines if the misfire has occurred using a misfire detection metric.

6. The vehicle of claim 5, wherein the misfire detection metric is defined by:
    (a) generating a difference value by subtracting the measured angular acceleration from the predicted angular acceleration of the crankshaft; and
    (b) dividing the difference value by a normalized crankshaft acceleration value.

7. The vehicle of claim 5, wherein the misfire detection metric is normalized.

8. The vehicle of claim 5, wherein misfire detection metric is dimensionless.

9. The vehicle of claim 5, wherein misfire detection metric is amplified to increase a signal-to-noise ratio.

10. The vehicle of claim 5, wherein the misfire detection module determines if the misfire has occurred based on the misfire detection metric exceeding a threshold.

11. The vehicle of claim 4, wherein the neural network includes a plurality of hidden layers, each of the hidden layers includes one or more processors.

12. The vehicle of claim 11, wherein the one or more processors use a hyperbolic tangent activation function.

13. The vehicle of claim 11, wherein the one or more processors are arranged to learn based on training data set using a Limited-memory BFGS (L-BFGS) technique.

14. The vehicle of claim 1, wherein the machine learning module includes a neural network arranged to generate a misfire flag in response to receipt of (a) a measured angular crank acceleration and (b) one or more inputs indicative of operation of the vehicle in the firing level modulation mode.

15. The vehicle of claim 14, wherein the machine learning module is further arranged to generate the misfire flag based on a probability score generated by the neural network, the probability score derived from a comparison between the measured angular crank acceleration and a predicted angular acceleration of the crankshaft.

16. The vehicle of claim 15, wherein the neural network generates the predicted angular crank acceleration of the crankshaft from the one or more inputs indicative of operation of the vehicle in the firing level modulation mode.

17. The vehicle of claim 14, wherein the neural network includes a plurality of hidden layers, each of the plurality of hidden layers having at least one processor.

18. The vehicle of claim 17, wherein the at least one processor performs a Rectified Linear ("ReLU") activation function.

19. The vehicle of claim 17, wherein the at least one processor is arranged to learn from training data using a Stochastic Gradient Descent (SGD) technique.

20. The vehicle of claim 1, wherein the firing level modulation mode is a skip fire mode, wherein a select cylinder is fired, skipped and selectively either fired or skipped in successive working cycles while the internal combustion engine is operating at the reduced effective displacement.

21. The vehicle of claim 20, wherein the machine learning module includes a neural network arranged to receive at least one skip fire operating parameter that is characteristic of the skip fire mode of operation of the internal combustion engine, the at least one skip fire operating parameter including one or more of the following:
 (a) a Fire Enable Flag for a next cylinder, a previous cylinder, and an opposing cylinder, respectively;
 (b) a cylinder skip number which is a number of skips preceding each firing for each of a plurality of cylinders in its own firing history respectively;
 (c) order skip number which is a number of skips preceding each firing in the firing order;
 (d) a Deceleration Cylinder Cut-Off (DCCO) exit flag which indicates an air pump-down event where valves associated with each of the cylinders are selectively opened without fuel injection to reduce intake manifold absolute pressure following DCCO events;
 (e) a weighted value compensating for effects of different skip fire patterns on angular crank acceleration; and
 (f) a skip fire status.

22. The vehicle of claim 1, wherein the machine learning module includes a neural network which is arranged to receive one or more inputs indicative of operation of the vehicle, the one or more inputs including: spark timing; fuel mass; fire skip status; fire enable flag; cylinder skip number; order skip number; mass air per cylinder; cam phase timing; charge air temperature; engine speed; manifold absolute pressure; transmission gear; Deceleration Cylinder Cut-Off (DCCO) exit; vehicle speed; torque request; pedal position; fuel pressure; and turbocharger waste gate position.

23. The vehicle of claim 1, further comprising a misfire counter arranged to count a plurality of misfires as determined by the machine learning module and to generate a notification when the plurality of misfires exceeds a threshold value.

24. The vehicle of claim 1, wherein the one or more torque output levels are each generated by using different air charge and/or fueling levels when firing the at least one cylinder.

25. The vehicle of claim 1, wherein the firing level modulation mode is a skip fire mode wherein the plurality of cylinders are fired and skipped in a predefined rolling pattern.

26. The vehicle of claim 1, wherein the machine learning module is classification based and is capable of predicting misfire flags.

27. An engine controller arranged to control operation of an internal combustion engine of a vehicle, the engine controller comprising:
 a firing level modulation module arranged to operate the internal combustion engine in a firing level modulation mode such that an output of a select cylinder, during a firing opportunity, is modulated so that the select cylinder selectively is either (a) intentionally skipped so as to generate no torque during the firing opportunity or (b) controlled so as to generate one or more different torque output levels when fired during the firing opportunity; and
 a machine learning module arranged to detect a misfire of the select cylinder during the firing opportunity by differentiating between an actual misfire of the select cylinder versus the intentionally skipping or generation of the one or more different torque output levels respectively.

28. The engine controller of claim 27, wherein the machine learning module includes a misfire detection module that determines when the misfire occurs by comparing a measured angular acceleration with a predicted angular acceleration of the crankshaft.

29. The engine controller of claim 28, wherein the misfire detection module is arranged to receive the measured crankshaft acceleration signal from a crank acceleration calculation module provided on the vehicle.

30. The engine controller of claim 28, further comprising a neural network which determines the predicted angular acceleration of the crankshaft in response to a plurality of inputs indicative of operation of the vehicle.

31. The engine controller of claim 30, wherein the one or more inputs are selected from:
 (a) a Fire Enable Flag for a next cylinder, a previous cylinder, and an opposing cylinder, respectively;
 (b) a cylinder skip number which is a number of skips preceding each firing for each of the plurality of cylinders in its own firing history respectively;
 (c) order skip number which is a number of skips preceding each firing for each of the plurality of cylinders in the firing order respectiyely.

32. The engine controller of claim 28, wherein the misfire detection module determines if the misfire has occurred based on a misfire detection metric exceeding a threshold.

33. The engine controller of claim 32, wherein the misfire detection metric is at least one of the following (a) normalized, (b) dimensionless and (c) amplified to increase a signal-to-noise ratio.

34. The engine controller of claim 27, wherein the machine learning module includes a neural network arranged to detect the misfire in response to receipt of:
 (a) a measured angular crank acceleration input; and
 (b) a plurality of inputs indicative of operation of the vehicle.

35. The engine controller of claim 34, wherein the neural network is further configured to:
 (c) generate a predicted angular crank acceleration from the plurality of inputs indicative of the operation of the vehicle;
 (d) generate a misfire flag based on a misfire detection metric exceeding a predefined threshold, the misfire detection metric derived from a comparison of the measured angular crank acceleration input and the predicted angular crank acceleration.

36. The engine controller of claim 34, wherein the neural network is further configured to:
 generate a misfire flag based on a probability score exceeding a predetermined value, wherein the probability score is an output of the neural network.

37. The engine controller of claim 27, wherein the machine learning module includes a neural network having a plurality of hidden layers, each of the hidden layers having one or more processors.

38. The engine controller of claim 37, wherein the one or more processors rely on an activation function.

39. The engine controller of claim 38, wherein the activation function comprises one of the following:
 a hyperbolic tangent activation function; or
 Rectified Linear function.

40. The engine controller of claim 37, wherein the one or more processors are arranged to learn on a training set of data using a learning technique.

41. The engine controller of claim 40, wherein the learning technique includes one of the following:
 Limited-memory BFGS; or
 Stochastic Gradient Descent (SGD).

42. The engine controller of claim 27, further comprising a misfire counter arranged to count a plurality of misfires as determined by the machine learning module and to generate a notification when the plurality of misfires exceeds a threshold value.

43. The engine controller of claim 27, wherein the firing level modulation mode is a skip fire mode, wherein for a given reduced effective displacement that is less than full displacement of the internal combustion engine while operating in the skip fire mode, at least one cylinder is fired, skipped and selectively either fired or skipped in successive working cycles.

44. The engine controller of claim 27, wherein the firing level modulation mode is a rolling skip fire mode where cylinders of the internal combustion engine are selectively fired or skipped in a predefined rolling pattern.

45. The engine controller of claim 27, wherein the firing level modulation mode is a dynamic multi-charge level mode where all cylinders of the internal combustion engine are fired, but individual working cycles are operated at different output levels.

46. The engine controller of claim 45, wherein the individual working cycles are operated at different output levels by using different air charge and/or fueling levels.

47. A method for controlling an internal combustion engine, the method comprising:
  operating cylinders of the internal combustion engine in a skip fire mode such that first firing opportunities of the cylinders are command to be fired while second firing opportunities of the cylinders are commanded to be not fired and intentionally skipped;
  using artificial intelligence to differentiate between (a) actual misfires of the plurality of cylinders that are commanded to be fired and (b) the intentional skips of the cylinders commanded to be not fired; and
  identifying the actual misfires differentiated from the intentional skips.

48. The method of claim 47, wherein using artificial intelligence further comprises:
  measuring angular crankshaft acceleration of a crankshaft of the vehicle;
  receiving at a neural network a plurality of inputs indicative of operation of the vehicle while operating in the skip fire mode;
  using the neural network to predict angular acceleration of the crankshaft in response to the plurality of inputs; and
  determining when the misfires occur by comparing the measured angular acceleration with the predicted angular acceleration of the crankshaft.

49. The method of claim 48, wherein the one or more inputs are selected from the group including: spark timing; fuel mass; fire skip status; fire enable flag; cylinder skip number; order skip number; mass air per cylinder; cam phase timing; charge air temperature; engine speed; manifold absolute pressure; transmission gear; Deceleration Cylinder Cut-Off (DCCO) exit; vehicle speed; torque request; pedal position; fuel pressure; and turbocharger waste gate position.

50. The method of claim 47, wherein identifying the actual misfires further comprises generating a misfire flag when a misfire detection metric exceeds a predefined threshold, the misfire detection metric derived from a comparison of a measured angular acceleration with a predicted angular acceleration of a crankshaft of the vehicle.

51. The method of claim 47, further comprising:
  counting the identified actual misfires; and
  generating a notification when the counted misfires exceeds a threshold value.

* * * * *